(12) United States Patent
Hamaguchi et al.

(10) Patent No.: US 7,127,153 B2
(45) Date of Patent: Oct. 24, 2006

(54) HOST SYSTEM, DRIVING APPARATUS, INFORMATION RECORDING AND READING METHOD FOR THE HOST SYSTEM, AND INFORMATION RECORDING AND READING METHOD FOR THE DRIVING APPARATUS

(75) Inventors: Takuro Hamaguchi, Ibaraki (JP); Hiroshi Sugimoto, Osaka (JP); Shinji Sasaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1162 days.

(21) Appl. No.: 10/002,414

(22) Filed: Oct. 23, 2001

(65) Prior Publication Data

US 2002/0076200 A1 Jun. 20, 2002

(30) Foreign Application Priority Data

Oct. 23, 2000 (JP) ............................. 2000-322297

(51) Int. Cl.
*H04N 5/91* (2006.01)
(52) U.S. Cl. ............................. 386/69; 386/45; 386/70; 386/125; 386/126
(58) Field of Classification Search ................ 386/45, 386/69–70, 125–126
See application file for complete search history.

(56) References Cited

U.S. PATENT DOCUMENTS 6,226,447 B1 * 5/2001 Sasaki et al. ............... 386/112

* cited by examiner

*Primary Examiner*—Thai Tran
*Assistant Examiner*—Helen Shibru
(74) *Attorney, Agent, or Firm*—Snell & Wilmer L.L.P.

(57) ABSTRACT

A host system used in combination with a driving apparatus for recording information on an information recording medium and reading information recorded on the information recording medium. The host system includes an instruction generation section for generating an instruction including designation information designating an operation type of an operation to be performed by the driving apparatus, and advanced notice information indicating whether the operation type of an operation immediately subsequent to the operation designated by the designation information is the same as the operation type of the operation designated by the designation information; and an output section for outputting the instruction to the driving apparatus. The operation type is either one of a recording operation of recording information on the information recording medium or a reading operation of reading information recorded on the information recording medium.

32 Claims, 16 Drawing Sheets

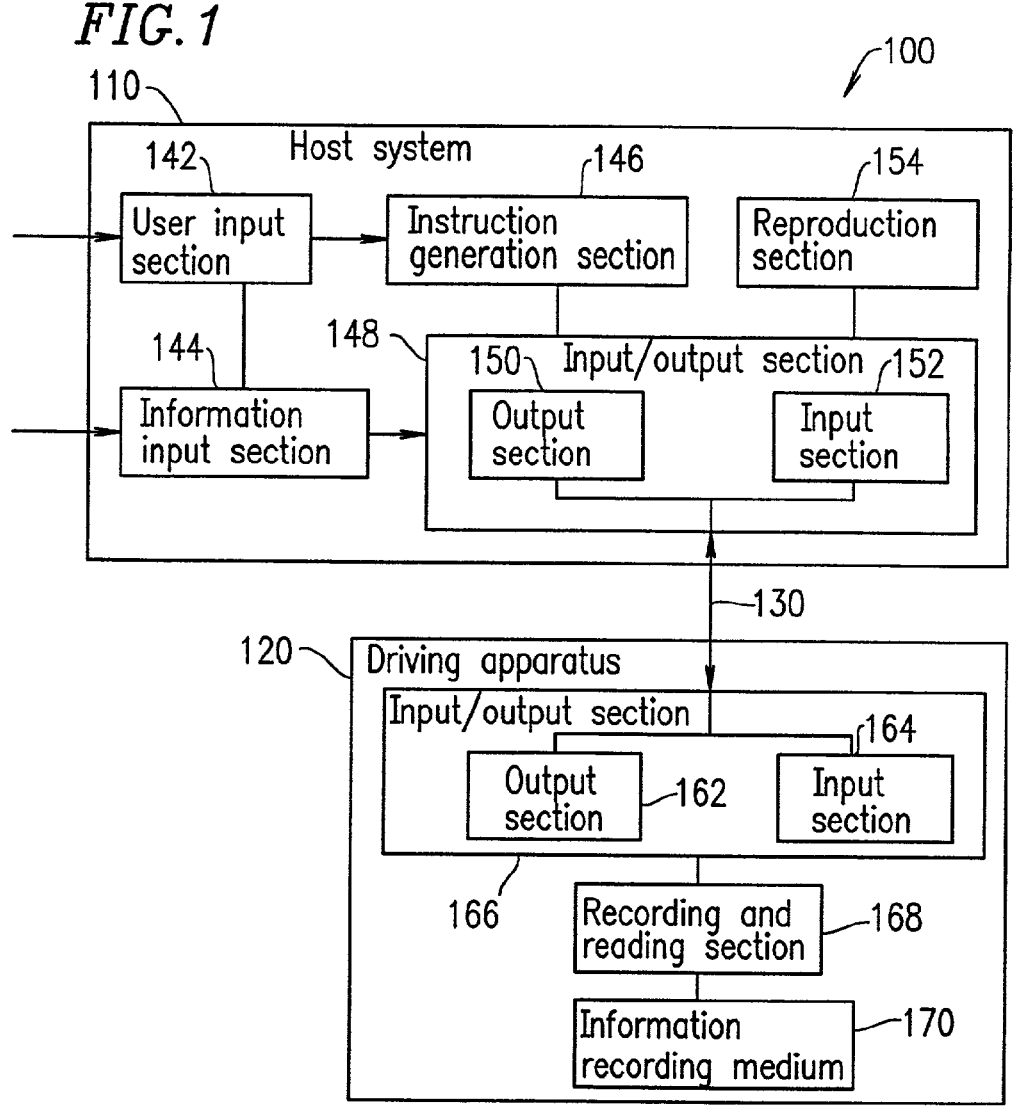

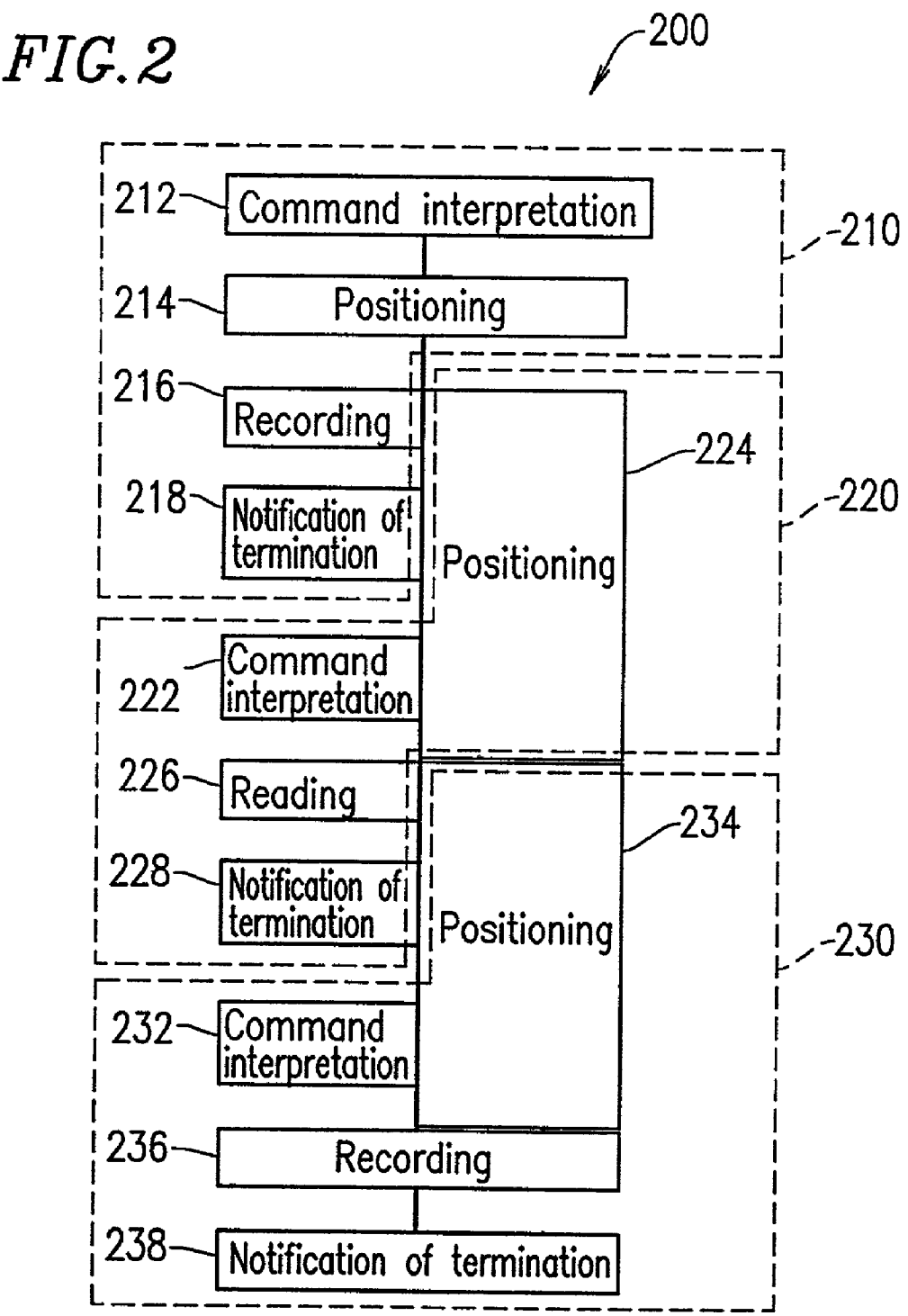

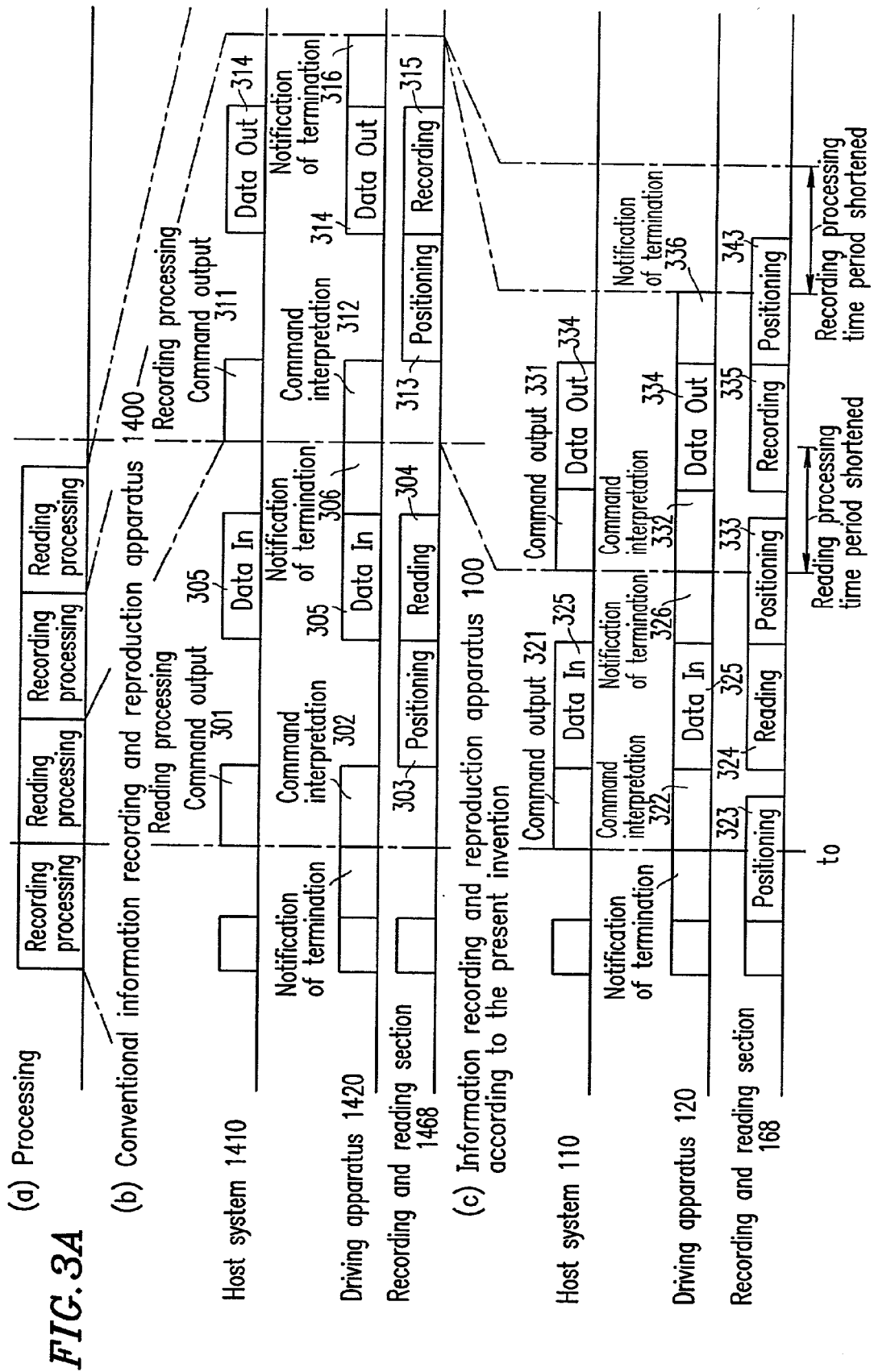

FIG.5

Reading/recording command CDB　　500

| Bit<br>Byte | 7 | 6 | 5 | 4 | 3 | 2 | 1 | 0 |
|---|---|---|---|---|---|---|---|---|
| 0 | Operation code ||||||||
| 1 | LUN ||| DPO | FUA | EBP | R | Rel Adr |
| 2 | (MSB) ||||||||
| 3 | Logical block address ||||||||
| 4 | ||||||||
| 5 | (LSB) ||||||||
| 6 | (MSB) ||||||||
| 7 | Transfer length ||||||||
| 8 | ||||||||
| 9 | (LSB) ||||||||
| 10 | Reserved ||||||| RWC |
| 11 | Control byte ||||||||

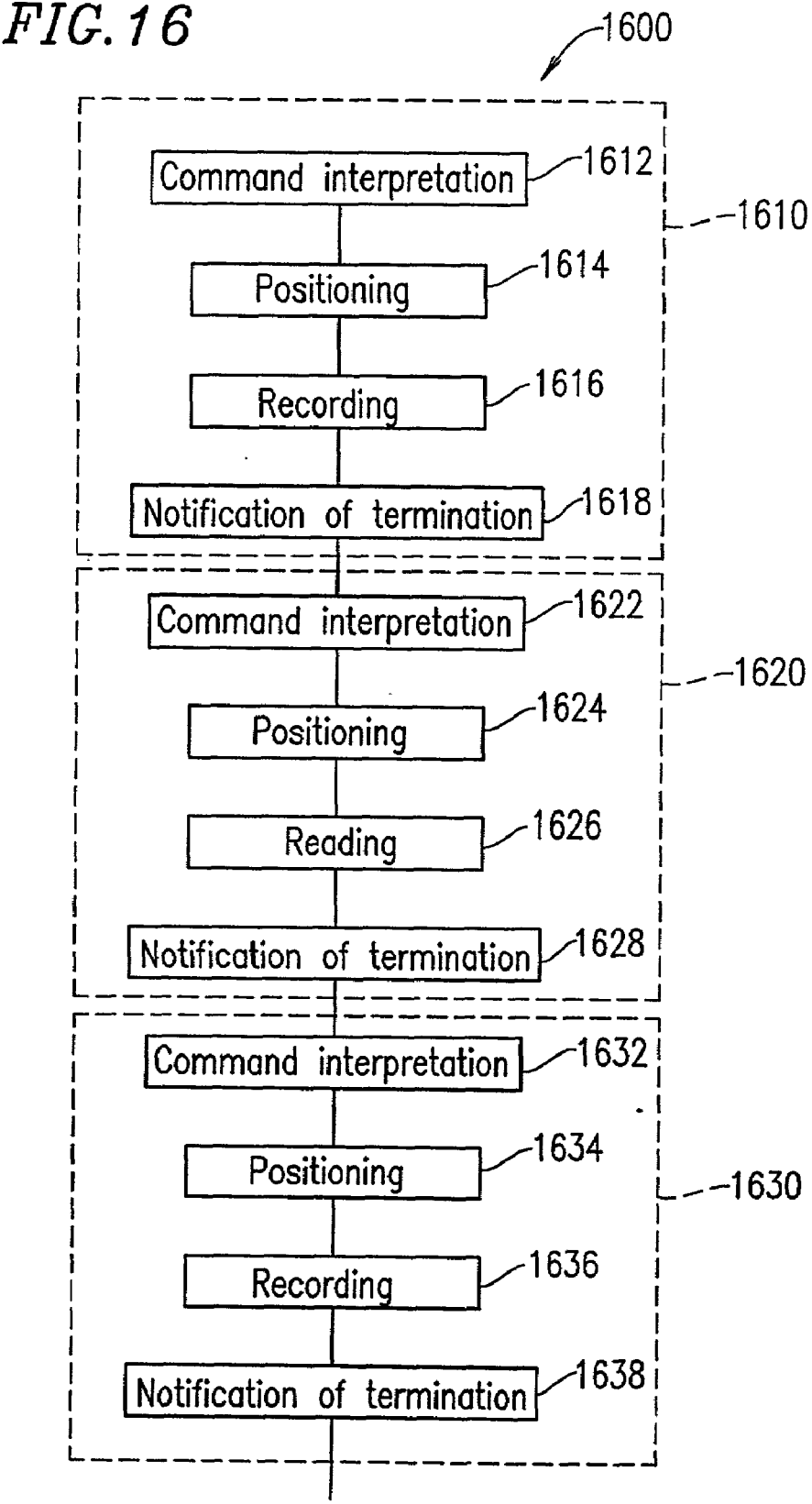

HOST SYSTEM, DRIVING APPARATUS, INFORMATION RECORDING AND READING METHOD FOR THE HOST SYSTEM, AND INFORMATION RECORDING AND READING METHOD FOR THE DRIVING APPARATUS

BACKGROUND OF THE INVENTION

1. Field of the Invention

The present invention relates to a host system and a driving apparatus included in an information recording and reproduction apparatus in which the driving apparatus records information on an information recording medium and reads information recorded on an information recording medium, and the host system outputs an instruction to the driving apparatus; an information recording and reading method for the host system; and information recording and reading method for the driving apparatus. In particular, the present invention relates to a host system and a driving apparatus for shortening a recording processing time period required for recording information on the information recording medium and a reading processing time period required for reading information from the information recording medium; an information recording and reading method for the host system; and an information recording and reading method for the driving apparatus.

2. Description of the Related Art

Information recording and reproduction apparatuses capable of recording information and reproducing recorded information are well known. An information recording and reproduction apparatus includes a driving apparatus for recording information on an information recording medium and reading information recorded on the information recording medium, and a host system for outputting an instruction to the driving apparatus. The host system outputs a command, to the driving apparatus, including an instruction for recording information on an information recording medium or an instruction for reading information recorded on the information recording medium for the purpose of reproducing the information.

FIG. 14 schematically shows a conventional information recording and reproduction apparatus 1400. The information recording and reproduction apparatus 1400 includes a host system 1410 and a driving apparatus 1420. The host system 1410 is connected to the driving apparatus 1420 through a connection bus 1430.

The host system 1410 includes a user input section 1442 for receiving an input from a user, an information input section 1444 for receiving information to be recorded on an information recording medium 1470 included in the driving apparatus 1420 from an external device, an instruction generation section 1446 for generating an instruction designating a type of operation to be performed by the driving apparatus 1420, an input/output section 1448 for outputting information to the driving apparatus 1420 and receiving information from the driving apparatus 1420, and a reproduction section 1456 for reproducing information. The input/output section 1448 includes an output section 1450 for outputting information to the driving apparatus 1420 and an input section 1452 for receiving information from the driving apparatus 1420.

The driving apparatus 1420 includes an input/output section 1466 for receiving information from the host system 1410 and outputting information to the host system 1410, and a recording and reading section 1468 for recording information on the information recording medium 1470 and reading information recorded on the information recording medium 1470. The input/output section 1466 includes an output section 1462 for outputting information to the host system 1410 and an input section 1464 for receiving information from the host system 1410.

The conventional information recording and reproduction apparatus 1400 operates as follows.

When the user needs information to be recorded, the user instructs the user input section 1442 to record the information on the information recording medium 1470. Based on the instruction from the user input section 1442, the instruction generation section 1446 generates an instruction designating the type of operation to be performed by the driving apparatus 1420, i.e., an operation of recording the information on the information recording medium 1470. The output section 1450 outputs a command including the instruction generated by the instruction generation section 1446 to the driving apparatus 1420.

When the user needs information recorded on the information recording medium 1470 to be reproduced, the user instructs the user input section 1442 to reproduce the information recorded on the information recording medium 1470. Based on the instruction from the user input section 1442, the instruction generation section 1446 generates an instruction designating the type of operation to be performed by the driving apparatus 1420, i.e., an operation of reading the information recorded on the information recording medium 1470. The output section 1450 outputs a command including the instruction generated by the instruction generation section 1446 to the driving apparatus 1420. The recording and reading section 1468 of the driving apparatus 1420 reads the information recorded on the information recording medium 1470 based on an instruction from the host system 1410. The input section 1452 of the host system 1410 receives the information read by the driving apparatus 1420 and the reproduction section 1456 reproduces the information.

FIG. 15 shows a flowchart 1500 illustrating an operation of the driving apparatus 1420 of the conventional information recording and reproduction apparatus 1400. The above-described operation of the information recording and reproduction apparatus 1400 will be described with reference to the flowchart 1500.

In step 1502, the input section 1464 of the driving apparatus 1420 receives a command which is output from the output section 1450 of the host system 1410 and interprets the command. The command includes an instruction designating the type of operation to be performed by the recording and reading section 1468 of the driving apparatus 1420, i.e., an operation of recording information on the information recording medium 1470 or an operation of reading information from the information recording medium 1470.

In step 1504, the recording and reading section 1468 starts positioning for the operation designated by the instruction. Positioning is conducted for preparing the recording and reading section 1468 for performing the operation designated by the instruction. When, for example, the type of operation designated by the instruction is for recording information on the information recording medium 1470, the recording and reading section 1468 performs positioning for recording the information at a prescribed address of the information recording medium 1470. When the type of operation designated by the instruction is for reading information recorded on the recording medium 1470, the recording and reading section 1468 performs positioning for reading the information from a prescribed address of the information recording medium 1470.

After the positioning is finished, in step 1506, the recording and reading section 1468 performs the operation designated by the instruction. When the type of operation designated by the instruction is for recording information on the information recording medium 1470, the recording and reading section 1468 records the information at the prescribed address of the information recording medium 1470. When the type of operation designated by the instruction is for reading information recorded on the recording medium 1470, the recording and reading section 1468 reads the information from the prescribed address of the information recording medium 1470.

After the operation designated by the instruction is finished, in step 1508, the output section 1462 of the driving apparatus 1420 outputs a notification indicating that the operation designated by the instruction is completed to the host system 1410 through the connection bus 1430.

The host system 1410 receives the notification indicating that the operation designated by the instruction is completed from the driving apparatus 1420 and, when necessary, outputs the next instruction to the driving apparatus 1420.

In this specification, the term "operation processing" is defined to include the step of interpreting a command including an instruction from the host system, the step of performing the positioning for the operation designated by the instruction, the step of performing the operation designated by the instruction, and the step of outputting a notification indicating the operation designated by the instruction is completed. The term "reading processing" is defined to include the step of interpreting a command including an instruction from the host system for reading information, the step of performing the positioning for the reading operation, the step of performing the reading operation, and the step of outputting a notification indicating the reading operation is completed. The term "recording processing" is defined to include the step of interpreting a command including an instruction from the host system for recording information, the step of performing the positioning for the recording operation, the step of performing the recording operation, and the step of outputting a notification indicating the recording operation is completed.

The conventional information recording and reproduction apparatus 1400 was developed with an assumption that a recording operation of information and a reading operation of information are performed at different times.

Recently, however, information recording and reproduction apparatuses are required to perform a recording operation of information and a reading operation of information concurrently, so that the user can reproduce one program while recording another program, or the user can record one program while reproduce a part of the same program which was broadcast several minutes before.

The recording and reading section 1468 of the driving apparatus 1420 of the conventional information recording and reproduction apparatus 1400 shown in FIG. 14 cannot record information on the information recording medium 1470 and read information recorded on the information recording medium 1470 concurrently. Therefore, when concurrent recording and reproduction of information is required, the recording and reading section 1468 alternately record information on the information recording medium 1470 and read information recorded on the information recording medium 1470.

FIG. 16 shows a flowchart 1600 illustrating an operation of the driving apparatus 1420 of the information recording and reproduction apparatus 1400 performing a process of recording information, reading information, and then recording another piece of information.

When concurrent recording and reproduction of information is requested, the output section 1450 of the host system 1410 sequentially outputs, to the driving apparatus 1420, a first command including an instruction for performing first recording processing 1610 (a first operation), a second command including an instruction for performing reading processing 1620 (a second operation) and a third command including an instruction for performing second recording processing 1630 (a third operation).

First recording processing 1610 is started as the first operation.

With reference to FIG. 16, in step 1612 of the first recording processing 1610, the input section 1464 of the driving apparatus 1420 receives the first command from the output section 1450 of the host system 1410 and interprets the command. The first command includes the instruction for performing the first recording processing 1610.

In step 1614, the recording and reading section 1468 of the driving apparatus 1420 performs positioning for recording the information on the information recording medium 1470.

After the positioning is finished, in step 1616, the recording and reading section 1468 records the information on the information recording medium 1470.

After the recording and reading section 1468 records the information on the information recording medium 1470, in step 1618, the output section 1462 of the driving apparatus 1420 outputs a notification indicating that the recording operation is completed to the host system 1410 through the connection bus 1430. At this point, the first recording processing 1610 is completed.

Then, the reading processing 1620 is started as the second operation.

In step 1622 of the reading processing 1620, the input section 1464 of the driving apparatus 1420 receives the second command from the output section 1450 of the host system 1410 and interprets the command. The second command includes the instruction for performing the reading processing 1620.

In step 1624, the recording and reading section 1468 of the driving apparatus 1420 performs positioning for reading the information recorded on the information recording medium 1470.

After the positioning is finished, in step 1626, the recording and reading section 1468 reads the information recorded on the information recording medium 1470.

After the recording and reading section 1468 reads the information recorded on the information recording medium 1470, in step 1628, the output section 1462 of the driving apparatus 1420 outputs a notification indicating that the reading operation is completed to the host system 1410 through the connection bus 1430. At this point, the reading processing 1620 is completed.

Then, the second recording processing 1630 is started as the third operation.

In step 1632 of the recording processing 1630, the input section 1464 of the driving apparatus 1420 receives the third command from the output section 1450 of the host system 1410 and interprets the command. The third command includes the instruction for performing the second recording processing 1630.

In step 1634, the recording and reading section 1468 of the driving apparatus 1420 performs positioning for recording the information recorded on the information recording medium 1470.

After the positioning is finished, in step 1636, the recording and reading section 1468 records the information on the information recording medium 1470.

After the recording and reading section 1468 records the information on the information recording medium 1470, in step 1638, the output section 1462 of the driving apparatus 1420 outputs a notification indicating that the recording operation is completed to the host system 1410 through the connection bus 1430. At this point, the second recording processing 1630 is completed.

As shown in FIG. 16, the information recording and reproduction apparatus 1400 performs the operation processing for recording or reading information in repetition.

The speed of recording processing and reproduction processing can be increased by shortening the operation processing time. In that case, concurrent recording and reproduction of even high bit rate (high density) information can be property performed.

SUMMARY OF THE INVENTION

According to one aspect of the invention, a host system is used in combination with a driving apparatus for recording information on an information recording medium and reading information recorded on the information recording medium. The host system includes an instruction generation section for generating an instruction including designation information designating an operation type of an operation to be performed by the driving apparatus, and advanced notice information indicating whether the operation type of an operation immediately subsequent to the operation designated by the designation information is the same as the operation type of the operation designated by the designation information; and an output section for outputting the instruction to the driving apparatus. The operation type is either one of a recording operation of recording information on the information recording medium or a reading operation of reading information recorded on the information recording medium.

In one embodiment of the invention, when the operation type designated by the designation information is the recording operation, the output section outputs information to be recorded by the driving apparatus on the information recording medium together with the designation information.

In one embodiment of the invention, the host system further includes an input section f or receiving, from the driving apparatus, information read by the driving apparatus from the information recording medium.

In one embodiment of the invention, the host system further includes a reproduction section for reproducing the information received by the input section from the driving apparatus.

In one embodiment of the invention, the host system further includes an information input section for receiving information to be recorded on the information recording medium. The instruction generation section includes a memory section for temporarily storing the information received by the information input section before the information is output from the output section to the driving apparatus so as to be recorded on the information recording medium and for temporarily storing the information received by the input section from the driving apparatus before the information is reproduced by the reproduction section; and a processing section for generating the designation information and the advanced notice information based on a state of the memory section.

According to another aspect of the invention, a driving apparatus used in combination with a host system includes a recording and reading section for recording information on an information recording medium and reading information recorded on the information recording medium; and an instruction receiving section for receiving, from the host system, an instruction including designation information designating an operation type of an operation to be performed by the recording and reading section, and advanced notice information indicating whether the operation type of an operation immediately subsequent to the operation designated by the designation information is the same as the operation type of the operation designated by the designation information. The operation type is either one of a recording operation of recording information on the information recording medium or a reading operation of reading information recorded on the information recording medium. The recording and reading section determines whether the operation type of the operation immediately subsequent to the operation designated by the designation information is the recording operation or the reading operation based on the designation information and the advanced notice information received by the instruction receiving section, and starts positioning for the determined operation type.

In one embodiment of the invention, the driving apparatus further includes a holding section for holding recording address information representing an address of the information recording medium to which the recording and reading section is to record information and reading address information representing an address of the information recording medium from which the recording and reading section is to read information. The recording and reading section starts positioning for the determined operation type based on the recording address information or the reading address information corresponding to the determined operation type.

In one embodiment of the invention, the positioning for the determined operation type includes at least one of position shifting of the recording and reading section to the address represented by the recording address information or the reading address information corresponding to the determined operation type, and rotation adjustment for adjusting a rotation speed of the information recording medium to a rotation speed corresponding to the address represented by the recording address information or the reading address information corresponding to the determined operation type.

In one embodiment of the invention, the recording and reading section starts the positioning for the determined operation type after the operation designated by the designation information is finished.

In one embodiment of the invention, when the operation type designated by the designation information is the reading operation and the determined operation type is the recording operation, the recording and reading section starts the positioning for the determined operation type while performing the operation designated by the designation information.

In one embodiment of the invention, the recording and reading section performs the rotation adjustment while performing the operation designated by the designation information.

In one embodiment of the invention, the reading address information or the recording address information held by the holding section is updated based on the designation information. The recording and reading section determines a rotation speed of the information recording medium corresponding to the determined operation type based on the determined operation type and the updated reading address information or recording address information, and adjusts the rotation speed of the information recording medium to the determined rotation speed.

In one embodiment of the invention, the recording and reading section determines whether the positioning for the determined operation type is to be started while performing the operation designated by the designation information based on the reading address information and the recording address information.

In one embodiment of the invention, when the determined operation type is the reading operation, the recording and reading section performs the operation immediately subsequent to the operation designated by the designation information after performing the positioning to the determined operation type.

In one embodiment of the invention, the holding section holds the information read by the recording and reading section from the information recording medium. When the operation type designated by the designation information and the determined operation type are both the reading operation, and an error occurs while the operation designated by the designation information is performed, the recording and reading section determines whether the operation designated by the designation information is to be performed again based on an amount of information read from the information recording medium and held by the holding section.

In one embodiment of the invention, when the operation type designated by the designation information is the reading operation and the determined operation type is the recording operation, and an error occurs while the operation designated by the designation information is performed, the recording and reading section performs the operation immediately subsequent to the operation designated by the designation information without performing the operation designated by the designation information again.

According to still another aspect of the invention, an information recording and reading method for a host system used in combination with a driving apparatus for recording information on an information recording medium and reading information recorded on the information recording medium includes the steps of generating an instruction including designation information designating an operation type of an operation to be performed by the driving apparatus, and advanced notice information indicating whether the operation type of an operation immediately subsequent to the operation designated by the designation information is the same as the operation type of the operation designated by the designation information; and outputting the instruction to the driving apparatus. The operation type is either one of a recording operation of recording information on the information recording medium or a reading operation of reading information recorded on the information recording medium.

In one embodiment of the invention, when the operation type designated by the designation information is the recording operation, the step of outputting includes the step of outputting information to be recorded by the driving apparatus on the information recording medium together with the designation information.

In one embodiment of the invention, the method further includes the step of receiving information read by the driving apparatus from the information recording medium.

In one embodiment of the invention, the method further includes the step of reproducing the information received from the driving apparatus.

In one embodiment of the invention, the method further includes the step of receiving information to be recorded on the information recording medium. The step of generating the instruction includes the step of generating the designation information and the advanced notice information based on a state of memory section, the memory section being for temporarily storing the information to be recorded on the information recording medium before the information is output to the driving apparatus so as to be recorded on the information recording medium and for temporarily storing the information read by the driving apparatus from the information recording medium before the information is reproduced.

According to still another aspect of the invention, an information recording and reading method for a driving apparatus used in combination with a host system is provided. The driving apparatus includes a recording and reading section for recording information on an information recording medium and reading information recorded on the information recording medium. The method includes the steps of receiving, from the host system, an instruction including designation information designating an operation type of an operation to be performed by the recording and reading section, and advanced notice information indicating whether the operation type of an operation immediately subsequent to the operation designated by the designation information is the same as the operation type of the operation designated by the designation information, wherein the operation type is either one of a recording operation of recording information on the information recording medium or a reading operation of reading information recorded on the information recording medium; determining whether the operation type of the operation immediately subsequent to the operation designated by the designation information is the recording operation or the reading operation based on the received designation information and the received advanced notice information; and starting positioning for the determined operation type.

In one embodiment of the invention, the method further includes the step of holding recording address information representing an address of the information recording medium to which the recording and reading section is to record information and reading address information representing an address of the information recording medium from which the recording and reading section is to read information. The step of starting positioning includes the step of starting the positioning for the determined operation type based on the recording address information or the reading address information corresponding to the determined operation type.

In one embodiment of the invention, the step of starting positioning includes at least one of the steps of performing position shifting of the recording and reading section to the address represented by the recording address information or the reading address information corresponding to the determined operation type, and performing rotation adjustment for adjusting a rotation speed of the information recording medium to a rotation speed corresponding to the address represented by the recording address information or the reading address information corresponding to the determined operation type.

In one embodiment of the invention, the step of starting positioning includes the step of starting the positioning for the determined operation type after the operation designated by the designation information is finished.

In one embodiment of the invention, when the operation type designated by the designation information is the reading operation and the determined operation type is the recording operation, the step of starting the positioning includes the step of starting positioning for the determined operation type while performing the operation designated by the designation information.

In one embodiment of the invention, the step of starting positioning includes the step of performing rotation adjustment of adjusting a rotation speed of the information recording medium to a rotation speed corresponding to the determined operation type while performing the operation designated by the designation information.

In one embodiment of the invention, the method further includes the step of updating the reading address information or the recording address information based on the designation information. The step of performing rotation adjustment includes the steps of determining a rotation speed of the information recording medium corresponding the determined operation type based on the determined operation type and the updated reading address information or recording address information, and adjusting the rotation speed of the information recording medium to the determined rotation speed.

In one embodiment of the invention, the step of starting positioning includes the step of determining whether the positioning for the determined operation type is to be started while performing the operation designated by the designation information based on the reading address information and the recording address information.

In one embodiment of the invention, when the determined operation type is the reading operation, the step of starting positioning includes the step of performing the operation immediately subsequent to the operation designated by the designation information after performing the positioning to the determined operation type.

In one embodiment of the invention, the method further includes the steps of holding the information read by the recording and reading section from the information recording medium, and when the operation type designated by the designation information and the determined operation type are both the reading operation, and an error occurs while the operation designated by the designation information is performed, determining whether the operation designated by the designation information is to be performed again based on an amount of information read from the information recording medium and held in the step of holding the information.

In one embodiment of the invention, when the operation type designated by the designation information is the reading operation and the determined operation type is the recording operation, and an error occurs while the operation designated by the designation information is performed, performing the operation immediately subsequent to the operation designated by the designation information without performing the operation designated by the designation information again.

Thus, the invention described herein makes possible the advantages of providing (1) a host system and a driving apparatus which are suitable for performing recording and reproduction of information concurrently; and an information recording and reading method for the host system and for the driving apparatus; and (2) a host system and a driving apparatus for reducing the recording processing time and the reproduction processing time of information; and an information recording and reading method for the host system and for the driving apparatus.

These and other advantages of the present invention will become apparent to those skilled in the art upon reading and understanding the following detailed description with reference to the accompanying figures.

BRIEF DESCRIPTION OF THE DRAWINGS

FIG. 1 is a schematic view diagram of an information recording and reproduction apparatus according to the present invention;

FIG. 2 is a flowchart illustrating an operation of a driving apparatus of the information recording and reproduction apparatus according to the present invention;

FIG. 3A shows an operation flow of one type of recording processing and reading processing performed by a host system and a driving apparatus of the information recording and reproduction apparatus according to the present invention, and an operation flow of recording processing and reading processing performed by a host system and a driving apparatus of a conventional information recording and reproduction apparatus;

FIG. 5 shows an exemplary command including an instruction generated by an instruction generation section of the information recording and reproduction apparatus shown in FIG. 4;

FIG. 16 is a flowchart illustrating an operation of the driving apparatus of the conventional information recording and reproduction apparatus.

DESCRIPTION OF THE PREFERRED EMBODIMENTS

Figure 3B:
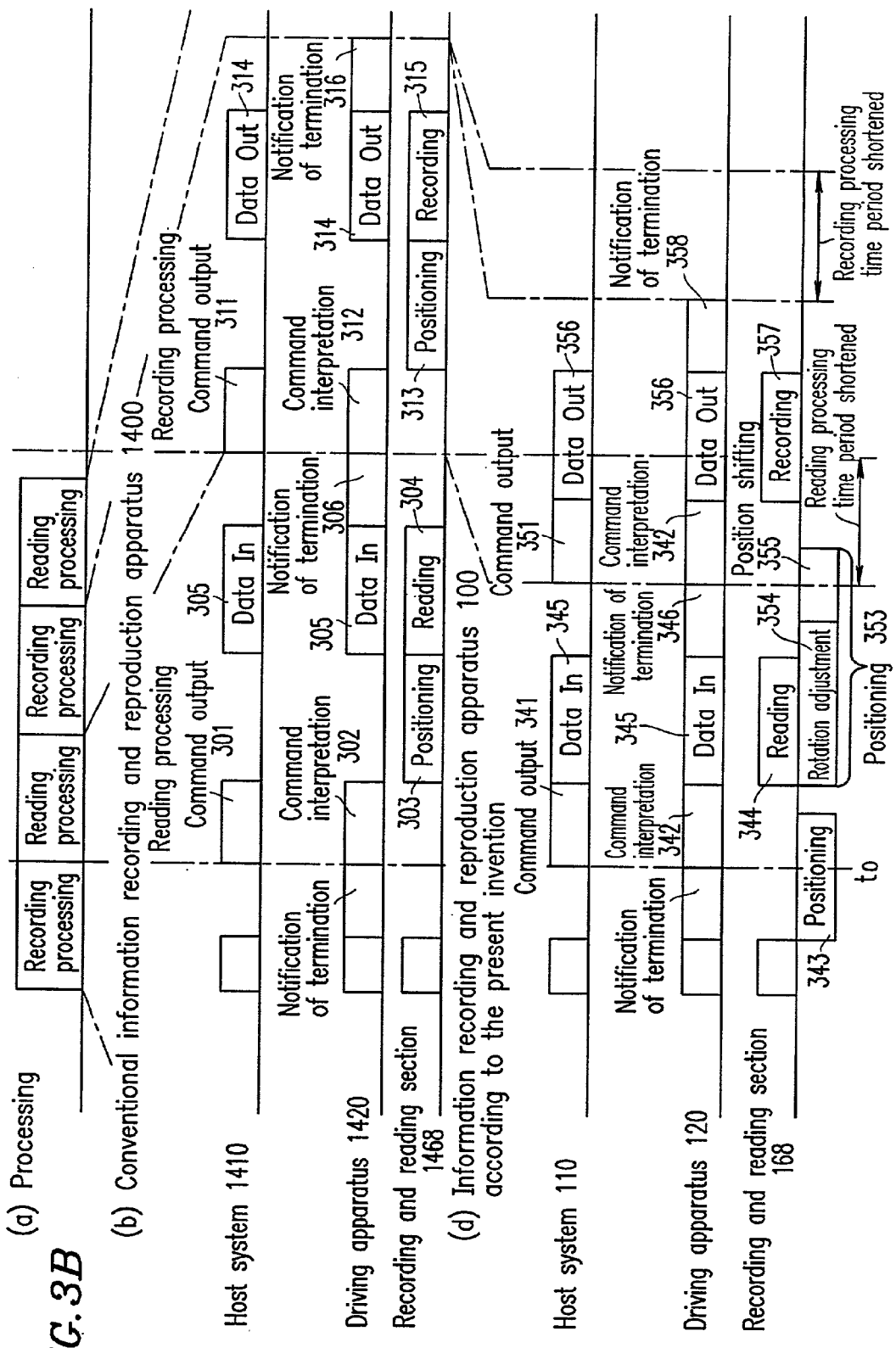
FIG. 3B shows an operation flow of another type of recording processing and reading processing performed by a host system and a driving apparatus of the information recording and reproduction apparatus according to the present invention, and an operation flow of recording processing and reading processing performed by a host system and a driving apparatus of a conventional information recording and reproduction apparatus.

Hereinafter, the present invention will be described by way of illustrative examples with reference to the accompanying drawings. Identical elements in different examples bear identical reference numerals.

First, the principle of the present invention will be described.

FIG. 1 schematically shows an information recording and reproduction apparatus 100. The information recording and reproduction apparatus 100 includes a host system 110 and a driving apparatus 120. The host system 110 is connected to the driving apparatus 120 through a connection bus 130.

The host system 110 includes a user input section 142 for receiving an input from a user, an information input section 144 for receiving information to be recorded on an information recording medium 170 included in the driving apparatus 120 from an external device, an instruction generation section 146 for generating an instruction, an input/output section 148 for outputting information to the driving apparatus 120 and receiving information from the driving apparatus 120, and a reproduction section 154 for reproducing information. The input/output section 148 includes an output section 150 for outputting information to the driving apparatus 120 and an input section 152 for receiving information from the driving apparatus 120.

The driving apparatus 120 includes an input/output section 166 for receiving information from the host system 110 and outputting information to the host system 110, and a recording and reading section 168 for recording information on the information recording medium 170 and reading information recorded on the information recording medium 170. The input/output section 166 includes an output section 162 for outputting information to the host system 110 and an input section 164 for receiving information from the host system 110.

The instruction generation section 146 of the host system 110 generates an instruction including designation information for designating a type of an operation of the driving apparatus 120 and also advanced notice information indicating whether or not an operation immediately subsequent to the designated operation is of the same type as that of the designated operation. The type of operation is either an operation for recording information on the information recording medium 170 or an operation of reading information recorded on the information recording medium 170. The output section 150 outputs the instruction to the driving apparatus 120 through the connection bus 130.

The input section 164 of the driving apparatus 120 receives an instruction from the host system 110. Thus, the input section 164 acts as an instruction receiving section. Based on the designation information and the advanced notice information received by the input section 164, the recording and reading section 168 of the driving apparatus 120 determines the type of operation immediately subsequent to the operation designated by the designation information. Accordingly, the recording and reading section 168 of the driving apparatus 120 can start positioning (or a seek operation) for the subsequent operation before receiving the designation information on the subsequent operation. As a result, the time period required for a series of recording and/or reading processing can be shortened by a portion or the entirety of the time period required for the positioning for the subsequent operation.

Figure 14:
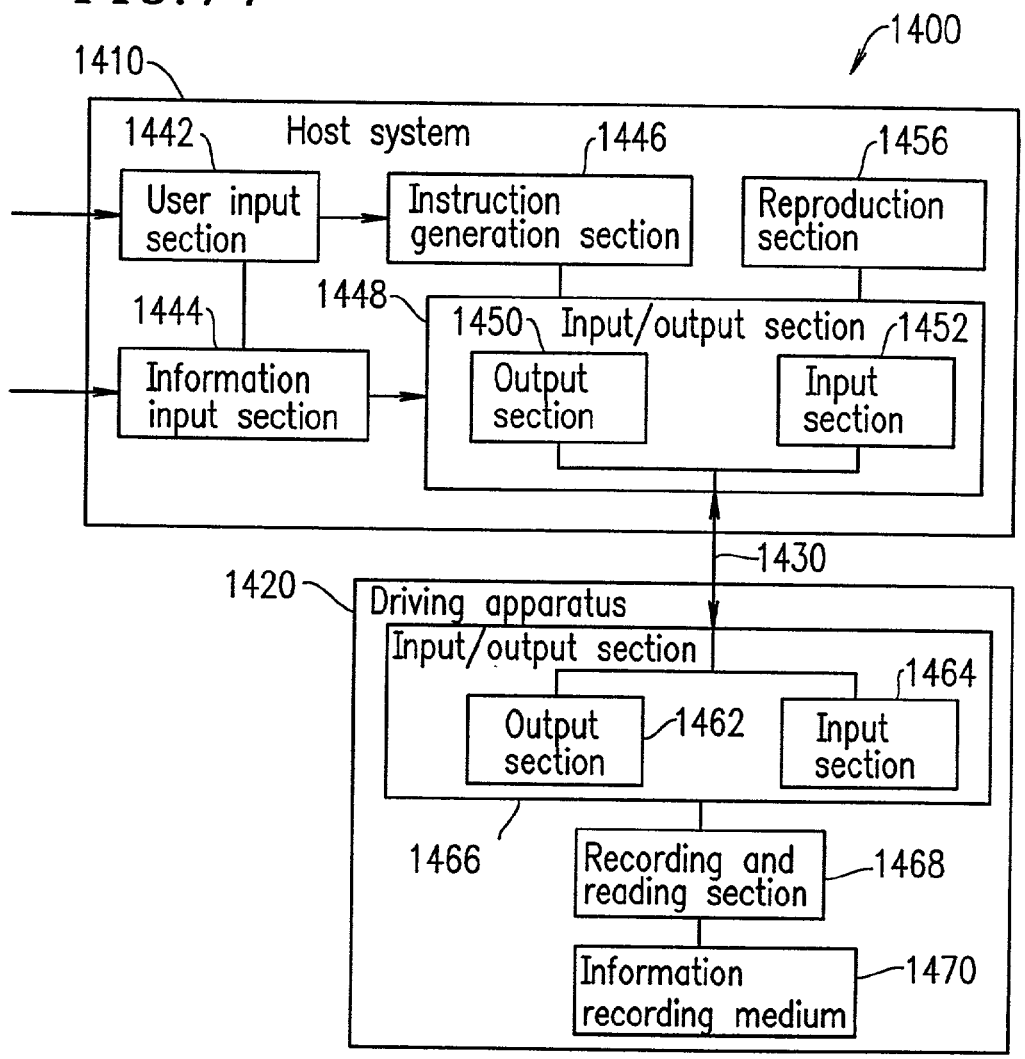
FIG. 14 is a schematic block diagram of a conventional information recording and reproduction apparatus.
Figure 15:
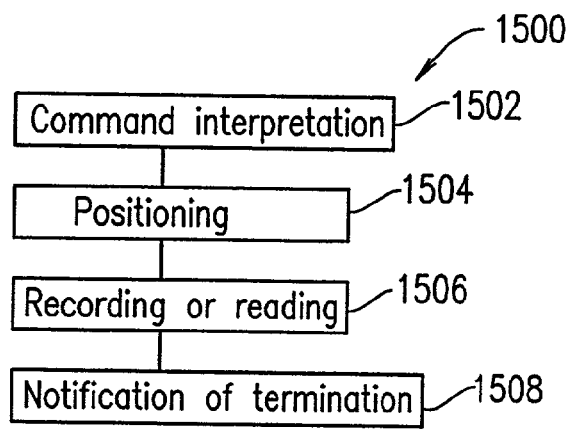
FIG. 15 is a flowchart illustrating an operation of a driving apparatus of the conventional information recording and reproduction apparatus.

FIG. 2 is a flowchart 200 illustrating an operation of the driving apparatus 120 of the information recording and reproduction apparatus 100. With reference to FIG. 2, an operation of the information recording and reproduction apparatus 100 performing a process of recording information, reading information and then recording another piece of information will be described for a proper comparison with the conventional information recording and reproduction apparatus 1400 shown in FIG. 14 and the operation illustrated in FIG. 15.

When concurrent recording and reproduction of information is requested, the output section 150 of the host system 110 sequentially outputs, to the driving apparatus 120, a first command instructing the driving apparatus 120 to perform first recording processing 210 as a first operation, a second command instructing the driving apparatus 120 to perform reading processing 220 as a second operation, and a third command instructing the driving apparatus 120 to perform second recording processing 230 as a third operation.

First, the first recording processing 210 as the first operation is started.

In step 212 of the first recording processing 210, the input section 164 of the driving apparatus 120 receives the first command from the output section 150 of the host system 110 and interprets the first command. The first command includes an instruction including designation information indicating that the type of the first operation to be performed by the driving apparatus 120 is for recording information on the information recording medium 170 and advanced notice information indicating that the second operation of the driving apparatus 120 immediately subsequent to the first operation is of a different type from that of the first operation. Based on the designation information and the advanced notice information, the recording and reading section 168 of the driving apparatus 120 determines that the type of the second operation is for reading information recorded on the information recording medium 170.

In step 214, the recording and reading section 168 performs positioning for recording the information on the information recording medium 170.

After the positioning is finished, in step 216, the recording and reading section 168 records the information on the information recording medium 170. The information recorded on the information recording medium 170 is information which was externally input to the information input section 144 and then output from the output section 150 to the driving apparatus 120 at an arbitrary time. For example, the information recorded on the information recording medium 170 may be output from the output section 150 together with the first command and recorded on the information recording medium 170 after the positioning. Alternatively, the information recorded on the information recording medium 170 may be output from the output section 150 after the positioning and recorded on the information recording medium 170. In the example shown in FIG. 1, the information input section 144 is included in the host system 110, but the present invention is not limited to such a structure.

After the recording and reading section 168 records the information on the information recording medium 170, in step 218, the output section 162 of the driving apparatus 120 outputs a notification indicating that the recording operation is completed to the host system 110 through the connection bus 130. At this point, the first recording processing 210 is completed.

Then, the reading processing 220 as the second operation is started.

In step 222 of the reading processing 220, the input section 164 of the driving apparatus 120 receives the second command from the output section 150 of the host system 110 and interprets the second command. The second command includes an instruction including designation information indicating that the type of the second operation to be performed by the driving apparatus 120 is for reading information recorded on the information recording medium 170 and advanced notice information indicating that the third operation of the driving apparatus 120 immediately subsequent to the second operation is of a different type from that of the second operation. Based on the designation information and the advanced notice information, the recording and reading section 168 of the driving apparatus 120 determines that the type of the third operation is for recording information on the information recording medium 170.

In step 224, the recording and reading section 168 performs positioning for reading the information recorded on the information recording medium 170. Although in FIG. 2, step 224 is shown as extending between step 216 of the first operation and step 222 of the second operation, this is intended to mean that the positioning for reading the information recorded on the information recording medium 170 is performed at an arbitrary time between the start of the recording in step 216 and the termination of the command interpretation in step 222.

Since the positioning is performed parallel to another step or steps, the reading processing 220 as the second operation requires a shorter time period than in the conventional information recording and reproduction apparatus 1400. The positioning need not be finished before the termination of the command interpretation in step 222. So long as the positioning is started before the termination of the command interpretation in step 222, the time period required for the reading processing 220 is shorter than in the information recording and reproduction apparatus 1400 by a portion of the time period required for the positioning.

After the positioning in step 224 and the command interpretation in step 222 are finished, in step 226, the recording and reading section 168 reads the information recorded on the information recording medium 170.

After the recording and reading section 168 reads the information recorded on the information recording medium 170, in step 228, the output section 162 of the driving apparatus 120 outputs a notification indicating that the reading operation is completed to the host system 110 through the connection bus 130. At this point, the reading processing 220 is completed.

Then, the second recording processing 230 as the third operation is started.

In step 232 of the second recording processing 230, the input section 164 of the driving apparatus 120 receives the third command from the output section 150 of the host system 110 and interprets the third command. The third command includes an instruction including designation information indicating that the type of the third operation to be performed by the driving apparatus 120 is for recording information on the information recording medium 170. Since the operation of the recording and reading section 168 is finished with the third operation, the third command does not include any advanced notice information, or even when advanced notice information is included, that advanced notice information is meaningless.

In step 234, the recording and reading section 168 performs positioning for recording the information on the information recording medium 170. Although in FIG. 2, step 234 is shown as extending between step 226 of the second operation and step 232 of the third operation, this is intended to mean that the positioning for recording the information on the information recording medium 170 is performed at an arbitrary time between the start of the recording in step 226 and the termination of the command interpretation in step 232.

Since the positioning is performed parallel to another step or steps, the second recording processing 230 as the third operation requires a shorter time period than in the conventional information recording and reproduction apparatus 1400. The positioning need not be finished before the termination of the command interpretation in step 232. So long as the positioning is started before the termination of the command interpretation in step 232, the time period required for the second recording processing 230 is shorter than in the information recording and reproduction apparatus 1400 by a portion of the time period required for the positioning.

After the positioning in step 234 and the command interpretation in step 232 are finished, in step 236, the recording and reading section 168 records the information on the information recording medium 170.

After the recording and reading section 168 records the information on the information recording medium 170, in step 238, the output section 162 of the driving apparatus 120 outputs a notification indicating that the recording operation is completed to the host system 110 through the connection bus 130. At this point, the second recording processing 230 is completed.

According to the present invention, the host system 110 outputs an instruction to the driving apparatus 120 including designation information for designating the type of operation to be performed by the driving apparatus 120 (or more specifically, the recording and reading section 168), and also advanced notice information indicating whether or not an operation immediately subsequent to the designated operation is of the same type as that of the designated operation. Therefore, the driving apparatus 120 or the recording and reading section 168 can determine the type of the subsequent operation without receiving the designation information on the subsequent operation and so can start positioning for the subsequent operation.

Herein, the term "positioning" is defined to refer to at least one of (i) position shifting of the recording and reading section 168 to the position of an address for which the recording or reading operation is to be performed and (ii) rotation adjustment of adjusting the rotation speed of the information recording medium 170 to a rotation speed corresponding to the address for which the recording or reading operation is to be performed.

In the case where the information recording medium 170 is, for example, a DVD-RAM, information recording or reading is performed at a certain linear velocity. In general, when the address for which the recording and reading section 168 is to perform is changed, the radial position of the information recording medium 170 for the operation is changed. Therefore, in order to appropriately record information on the information recording medium 170 or read information recorded on the information recording medium 170, the rotation speed of the information recording medium 170 needs to be changed in accordance with the address.

FIGS. 3A and 3B are timing diagrams schematically comparing the recording and reading processing performed by the host system 110 and the driving apparatus 120 of the information recording and reproduction apparatus 100 according to the present invention with the recording and reading processing performed by the host system 1410 and the driving apparatus 1420 of the conventional information recording and reproduction apparatus 1400.

FIG. 3A shows an operation flow in which the positioning is performed without overlapping with the recording processing or the reading processing on a temporal scale.

Section (a) shows that first recording processing, first reading processing, second recording processing, and second reading processing are preformed in this order. The first reading processing starts at time $t_0$.

Section (b) shows operations performed by the host system 1410, the driving apparatus 1420 and the recording and reading section 1468 of the conventional information recording and reproduction apparatus 1400.

Section (c) shows operations performed by the host system 110, the driving apparatus 120 and the recording and reading section 168 of the information recording and reproduction apparatus 100 according to the present invention.

First, the operation of the conventional information recording and reproduction apparatus 1400 when the first reading processing starts at time $t_0$ will be described.

In step 301, the host system 1410 outputs, to the driving apparatus 1420, a command including an instruction indicating that the type of operation to be performed by the driving apparatus 1420 is for reading information recorded on the information recording medium 1470.

In step 302, the driving apparatus 1420 receives and interprets the command.

In step 303, based on the instruction included in the command, the recording and reading section 1468 performs positioning for reading the information recorded on the information recording medium 1470.

In step 304, the recording and reading section 1468 reads the information recorded on the information recording medium 1470.

In step 305, the recording and reading section 1468 immediately outputs the information read from the information recording medium 1470 to the host system 1410.

After the recording and reading section 1468 reads the information recorded on the information recording medium 1470, in step 306, the driving apparatus 1420 outputs a notification indicating that the reading operation is completed to the host system 1410. At this point, the first reading processing is competed.

Then, the second recording processing is started.

In step 311, the host system 1410 outputs, to the driving apparatus 1420, a command including an instruction indicating that the type of operation to be performed by the driving apparatus 1420 is for recording information on the information recording medium 1470.

In step 312, the driving apparatus 1420 receives and interprets the command.

In step 313, based on the instruction included in the command, the recording and reading section 1468 performs positioning for recording the information on the information recording medium 1470.

In step 314, the host system 1410 outputs, to the driving apparatus 1420, the information to be recorded on the information recording medium 1470.

In step 315, the recording and reading section 1468 records the information output from the host system 1410 on the information recording medium 1470.

After the recording and reading section 1468 records the information on the information recording medium 1470, in step 316, the driving apparatus 1420 outputs a notification indicating that the recording operation is completed to the host system 1410. At this point, the second recording processing is competed.

Hereinafter, the operation of the information recording and reproduction apparatus 100 when the first reading processing starts at time $t_0$ will be described with reference to section (c) of FIG. 3A. While performing an operation immediately before time $t_0$, the recording and reading section 168 already starts positioning for reading information in step 323, based on the command output for the operation immediately before time $t_0$. The operation immediately before time $t_0$ is a recording operation, and the command includes an instruction including designation information indicating that the type of operation to be performed by the driving apparatus 120 is for recording information and advanced notice information indicating that the type of the subsequent operation is different from the recording operation.

In step 321, the host system 110 outputs, to the driving apparatus 120, a command including an instruction including designation information indicating that the type of operation to be performed by the driving apparatus 120 is for reading information recorded on the information recording medium 170 and advanced notice information indicating that the operation to be performed by the driving apparatus 120 immediately subsequent to the reading operation is of a different type from that of the reading operation.

In step 322, the driving apparatus 120 receives and interprets the command.

It should be noted that the recording and reading section 168 need not start the positioning in step 323 for reading the information recorded on the information recording medium 170. The reason for this is such positioning is already started before the command interpretation in step 322. This is realized because the instruction according to the present invention includes designation information for designating the type of operation to be performed by the driving apparatus 120 and advanced notice information indicating whether or not an operation immediately subsequent to the designated operation is of the same type as that of the designated operation.

In step 324, the recording and reading section 168 reads the information recorded on the information recording medium 170.

In step 325, the recording and reading section 168 immediately outputs the information read from the information recording medium 170 to the host system 110.

After the recording and reading section 168 reads the information recorded on the information recording medium 170, in step 326, the driving apparatus 120 outputs a notification indicating that the reading operation is completed to the host system 110. At this point, the first reading processing is competed.

During performing step 326, the recording and reading section 168 starts positioning in step 333 for recording information on the information recording medium 170 based on the designation information and the advanced notice information included in the instruction output in step 321. In more detail, the recording and reading section 168 determines that the type of the immediately subsequent operation to be performed by the driving apparatus 120 is for recording information on the information recording medium 170 and thus starts such positioning.

Then, the second recording processing is started.

In step 331, the host system 110 outputs, to the driving apparatus 120, a command including an instruction including designation information indicating that the type of operation to be performed by the driving apparatus 120 is for recording information on the information recording medium 170 and advanced notice information indicating that the operation to be performed by the driving apparatus 120 immediately subsequent to the recording operation is of a different type from that of the recording operation.

In step 332, the driving apparatus 120 receives and interprets the command.

In step 334, the host system 110 outputs, to the driving apparatus 120, the information to be recorded on the information recording medium 170.

In step 335, the recording and reading section 168 records the information output from the host system 110 on the information recording medium 170.

After the recording and reading section 168 records the information on the information recording medium 170, in step 336, the driving apparatus 120 outputs a notification indicating that the recording operation is completed to the host system 110. At this point, the second recording processing is competed.

In section (c) of FIG. 3A, the positioning is performed without overlapping with the recording operation or the reading operation on a temporal scale. As described above with reference to FIG. 2, the positioning may be performed while overlapping with the recording operation or the reading operation on a temporal scale.

FIG. 3B shows an operation flow in which the positioning is performed while overlapping with the recording processing and reading processing on a temporal scale. Sections (a) and (b) are identical with those of FIG. 3A and are not described.

With reference to section (d) of FIG. 3B, the operation of the information recording and reproduction apparatus 100 will be described. The first reading processing starts at time $t_0$. As in section (c) of FIG. 3A, section (d) of FIG. 3B shows operations performed by the host system 110, the driving apparatus 120 and the recording and reading section 168 of the information recording and reproduction apparatus 100 according to the present invention.

While performing an operation immediately before time $t_0$, the recording and reading section 168 already starts positioning for reading information in step 343, based on the command output for the operation immediately before time $t_0$. The operation immediately before time $t_0$ is a recording operation, and the command includes an instruction including designation information indicating that the type of operation to be performed by the driving apparatus 120 is for recording information and advanced notice information indicating that the type of the subsequent operation is different from the recording operation.

In step 341, the host system 110 outputs, to the driving apparatus 120, a command including an instruction including designation information indicating that the type of operation to be performed by the driving apparatus 120 is for reading information recorded on the information recording medium 170 and advanced notice information indicating that the operation to be performed by the driving apparatus 120 immediately subsequent to the reading operation is of a different type from that of the reading operation.

In step 342, the driving apparatus 120 receives and interprets the command.

In step 344, the recording and reading section 168 reads the information recorded on the information recording medium 170.

In step 345, the recording and reading section 168 immediately outputs the information read from the information recording medium 170 to the host system 110.

During performing step 344 and step 345, the recording and reading section 168 starts positioning in step 353 for recording information on the information recording medium 170 based on the designation information and the advanced notice information included in the instruction output in step 341. In more detail, the recording and reading section 168 determines that the type of the immediately subsequent operation to be performed by the driving apparatus 120 is for recording information on the information recording medium 170 and thus starts such positioning. The positioning performed in step 353 includes rotation adjustment (step 354) which is performed while the driving apparatus 120 and the recording and reading section 168 performs the reading operation, and position shifting (step 355) which is performed after the rotation adjustment.

After the recording and reading section 168 reads the information recorded on the information recording medium 170, in step 346, the driving apparatus 120 outputs a notification indicating that the reading operation is completed to the host system 110. At this point, the first reading processing is competed.

Then, the second recording processing is started.

In step 351, the host system 110 outputs, to the driving apparatus 120, a command including an instruction including designation information indicating that the type of operation to be performed by the driving apparatus 120 is for recording information on the information recording medium 170 and advanced notice information indicating that the operation to be performed by the driving apparatus 120 immediately subsequent to the recording operation is of a different type from that of the recording operation.

In step 352, the driving apparatus 120 receives and interprets the command.

In step 356, the host system 110 outputs, to the driving apparatus 120, the information to be recorded on the information recording medium 170.

In step 357, the recording and reading section 168 records the information output from the host system 110 on the information recording medium 170.

After the recording and reading section 168 records the information on the information recording medium 170, in step 358, the driving apparatus 120 outputs a notification indicating that the recording operation is completed to the host system 110. At this point, the second recording processing is competed.

According to the present invention, the recording and reading section 168 of the information recording and reproduction apparatus 100 starts positioning for the subsequent operation before receiving the designation information on the subsequent operation. Therefore, the reading processing time period and the recording processing time period can be shortened as compared to the conventional information recording and reproduction apparatus 1400.

Hereinafter, specific examples according to the present invention will be described. A first example is directed to an operation of an information recording and reproduction apparatus according to the present invention in accordance with section (c) of FIG. 3A. A second example and a third example are directed to an operation of an information recording and reproduction apparatus according to the present invention in accordance with section (d) of FIG. 3B.

EXAMPLE 1

Figure 4:
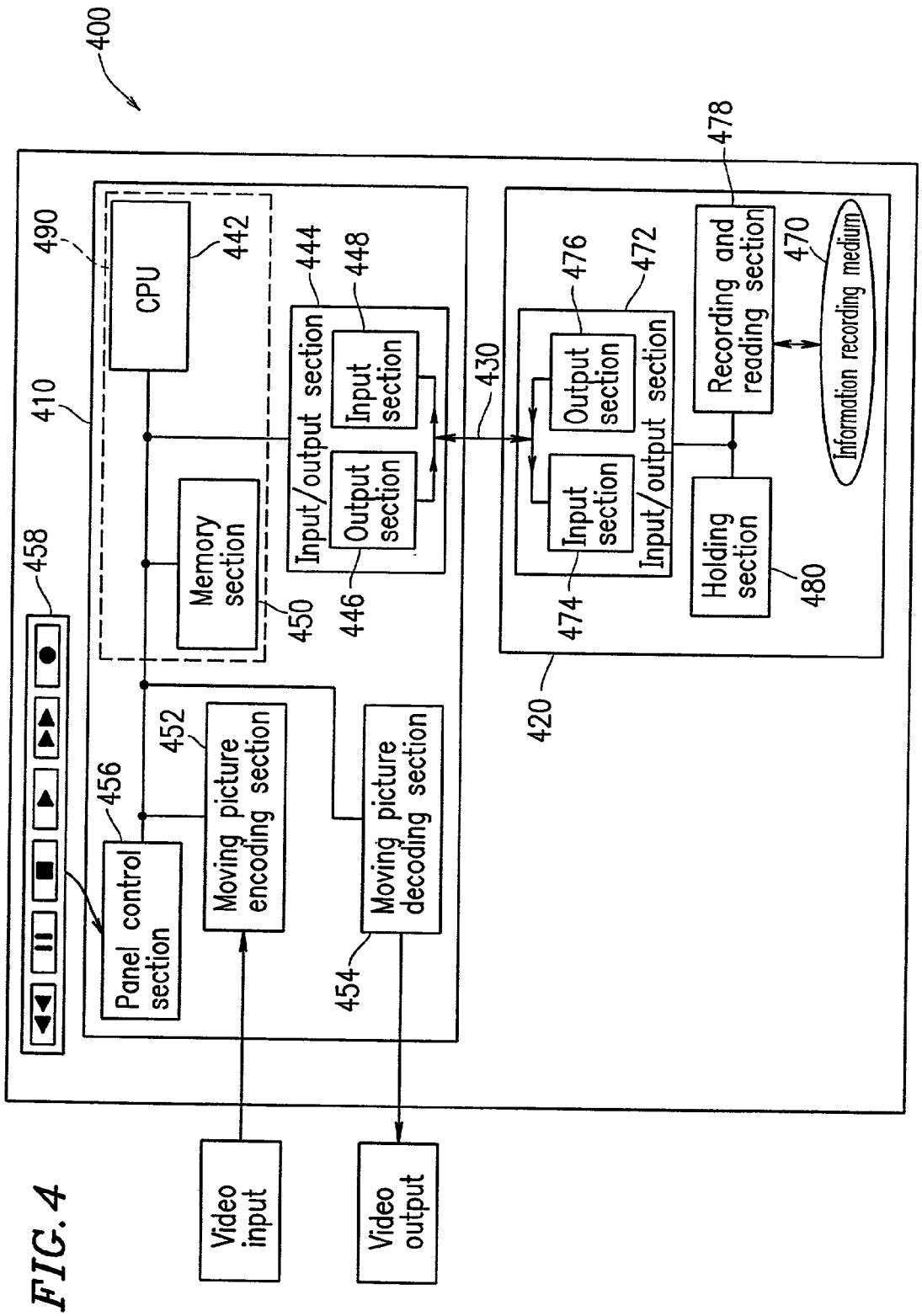
FIG. 4 is a schematic view diagram of an information recording and reproduction apparatus according to examples of the present invention.

FIG. 4 schematically shows a structure of an information recording and reproduction apparatus 400 according to a first example of the present invention. The information recording and reproduction apparatus 400 includes a host system 410 and a driving apparatus 420. The host system 410 is connected to the driving apparatus 420 through a connection bus 430.

The host system 410 includes a CPU 442, an input/output section 444, a memory section 450, a moving picture encoding section 452, a moving picture decoding section 454, and a panel control section 456. The elements in the host system 410 are each accessible from the CPU 442. The input/output section 444 includes an input section 448 for receiving information from the driving apparatus 420 and an output section 446 for outputting information to the driving apparatus 420. The CPU 442 and the memory section 450 together act as an instruction generation section 490.

The driving apparatus 420 includes an input/output section 472, a recording and reading section 478, and a holding section 480. The input/output section 472 includes an input section 474 for receiving information from the host system 410 and an output section 476 for outputting information to the host system 410.

The information recording and reproduction apparatus 400 shown in FIG. 4 has a structure capable of recording and reproducing video data. This is merely illustrative and the present invention is not limited to an apparatus for processing video data.

The CPU 442 reads a program stored in the memory section 450 and execute the program. The moving picture encoding section 452 converts analog moving picture data which is externally input into digitally compressed moving picture data. The digitally compressed moving picture data is stored in the memory section 450. The moving picture decoding section 454 converts the digitally compressed moving picture data stored in the memory section 450 into analog moving picture data and externally outputs or reproduces the analog moving picture data. In the first example of the present invention, the moving picture decoding section 454 acts as a reproduction section for reproducing information recorded on an information recording medium 470 included in the driving apparatus 420.

The panel control section 456 receives a request which is input from a user to a panel 458 and transfers the request to the CPU 442. The panel 458 shown in FIG. 4 includes rewind, pause, stop, play, fast forward, and record buttons from the left. The input/output section 444 outputs a command including an instruction to the driving apparatus 420 based on the request from the CPU 442.

The input/output section 472 of the driving apparatus 420 controls the holding section 480, controls the recording and reading section 478, and controls signal input from and output to the host system 410. The holding section 480 is a memory for temporarily storing data transferred between the host system 410 and the recording and reading section 478 so as to increase information input and output processing. The recording and reading section 478 records data on the information recording medium 470 or reads data recorded on the information recording medium 470 in accordance with the type of operation designated by designation information which is received by the input/output section 472. While recording or reading data, the recording and reading section 478 also performs position shifting of the information recording medium 470 to a position at which recording or reading is to be performed, or rotation adjustment of adjusting the rotation speed of the information recording medium 470.

The information recording medium 470 is, for example, an optical disc.

Data is reproduced or recorded by the information recording and reproduction apparatus 400 as follows.

First, the host system 410 operates as follows. When a request input by the user is received by the panel control section 456 from the panel 458, the panel control section 456 transfers the request to the CPU 442.

When the request is a reproduction request, the CPU 442 generates an instruction to the driving apparatus 420 for reading data recorded on the information recording medium 470. A command including the instruction is output to the driving apparatus 420 from the output section 446. Based on the instruction, the recording and reading section 478 reads data from the information recording medium 470. The output section 476 outputs the data read from the information recording medium 470 to the input section 448 through the connection bus 430. The data received by the input section 448 is output to the memory section 450. Then, the data is decoded by the moving picture decoding section 454 and output as a video.

When the request is a recording request, the moving picture encoding section 452 encodes input video data. The encoded data is stored in the memory section 450. The data is then output to the driving apparatus 420 from the output section 446 and recorded on the information recording medium 470.

The driving apparatus 420 operates as follows. When the input/output section 472 receives the instruction for reading data recorded on the information recording medium 470 from the host system 410, the recording and reading section 478 performs positioning so as to be shifted to a position of the information recording medium 470 at which data to be read is stored (reading address). The data read by the recording and reading section 478 is temporarily stored in the holding section 480 and then transferred to the host system 410 at an arbitrary time.

When the input/output section 472 receives the instruction for recording data on the information recording medium 470 from the host system 410, the recording and reading section 478 performs positioning so as to be shifted to a position of the information recording medium 470 at which the data is to be recorded (recording address). Then, data which is transferred from the host system 410 to the holding section 480 at an arbitrary time is recorded on the information recording medium 470.

After reading the requested data from the information recording medium 470, the recording and reading section 478 may perform positioning in expectation that a request is input by the user for reading data from another position of the information recording medium 470. In this case, the recording and reading section 478 is shifted to a reading address immediately subsequent to the reading address from which data has been read. The recording and reading section 478 may also read data and cause the holding section 480 to store the data. In this specification, reading of data which has a high possibility of being requested to be read subsequently and storing the data in the holding section 480 will be referred to as "pre-reading".

In general, video data is recorded in continuous addresses. Therefore, when the driving apparatus 420 receives an instruction for reading data immediately subsequent to the data which was just read, positioning and pre-reading performed by the recording and reading section 478 contribute to an increase in the speed of the reading processing for the following reason. When the recording and reading section 478 performs positioning and pre-reading, the recording and reading section 478 need not perform positioning or reading after receiving the instruction, the data read from the information recording medium 470 is already stored in the holding section 480 and can be output to the host system 410 from the output section 476 immediately.

When the driving apparatus 420 receives an instruction for recording data immediately subsequent to the data which was just recorded, positioning performed by the recording and reading section 478 after recording the requested data on the information recording medium 470 contributes to an increase in the speed of the recording processing in the same manner as described above regarding the reading processing.

In FIG. 4, the connection bus 430 may be a SCSI (Small Computer System Interface) bus, which is one type of system bus. When the SCSI bus 430 is used, commands are transferred in the form of CDBs (Command Descriptor Blocks).

FIG. 5 shows an exemplary command 500 including an instruction generated by the instruction generation section 490. The command 500 is a CDB and includes an instruction for recording or reading information. The CDB 500 has the following structure.

Byte 0 specifies an operation code (designation information) for designating the type of operation to be performed by the driving apparatus 420, i.e., a recording operation or a reading information. A command 500 in which the designation information designates a recording operation will be referred to as a "recording command". A command 500 in which the designation information designates a reading operation will be referred to as a "reading command".

Bytes 2 through 5 specify a logical block address representing an address of the information recording medium 470.

Bytes 6 through 9 specify a transfer length, i.e., a capacitance of the data to be recorded or read.

Bit 0 of byte 10 is referred to as a "RWC (Read/Write Change) bit and used for notifying in advance whether the immediately subsequent operation to be performed by the driving apparatus 420 is a reading operation for reading data recording on the information recording medium 470 or a recording operation of recording data on the information recording medium 470. In more detail, the RWC bit acts as advanced notice information indicating whether an operation immediately subsequent to the operation designated by the designation information is of the same type as that of the operation designated by the designation information.

Specifically, when the command 500 is a recording command, RWC bit "1" indicates that the command which will be output next is a reading command. RWC bit "0" indicates that the command which will be output next is a recording command.

When the command 500 is a reading command, RWC bit "1" indicates that the command which will be output next is a recording command. RWC bit "0" indicates that the command which will be output next is a reading command.

Accordingly, the driving apparatus 420 analyses the operation code and the RWC bit in order to determine whether the command which will be output next is a recording command or a reading command.

The other fields of the CDB 500 are irrelevant to the present invention and will not be described.

Figure 6:
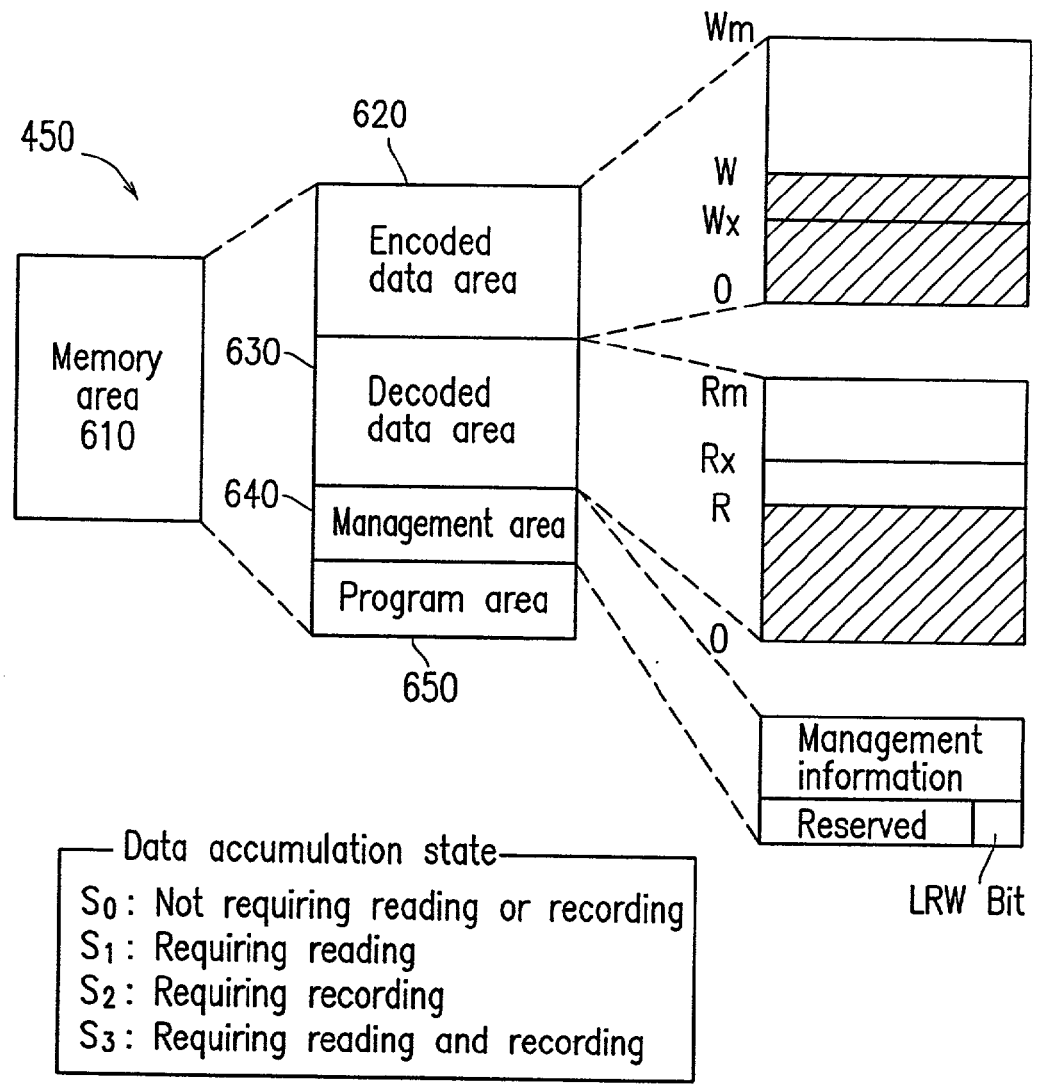
FIG. 6 shows details of a memory area of a memory section of the host system of the information recording and reproduction apparatus shown in FIG. 4.

FIG. 6 shows a memory area 610 of the memory section 450 of the host system 410 in detail.

The memory area 610 includes an encoded data area 620 for storing moving picture data digitally compressed by the moving picture encoding section 452, a decoded data area 630 for storing moving data converted to analog data by the moving picture decoding section 454 to be externally output, a management area 640 used by the CPU 442, and a program area 650 for storing a program to be read by the CPU 442.

Figure 7:
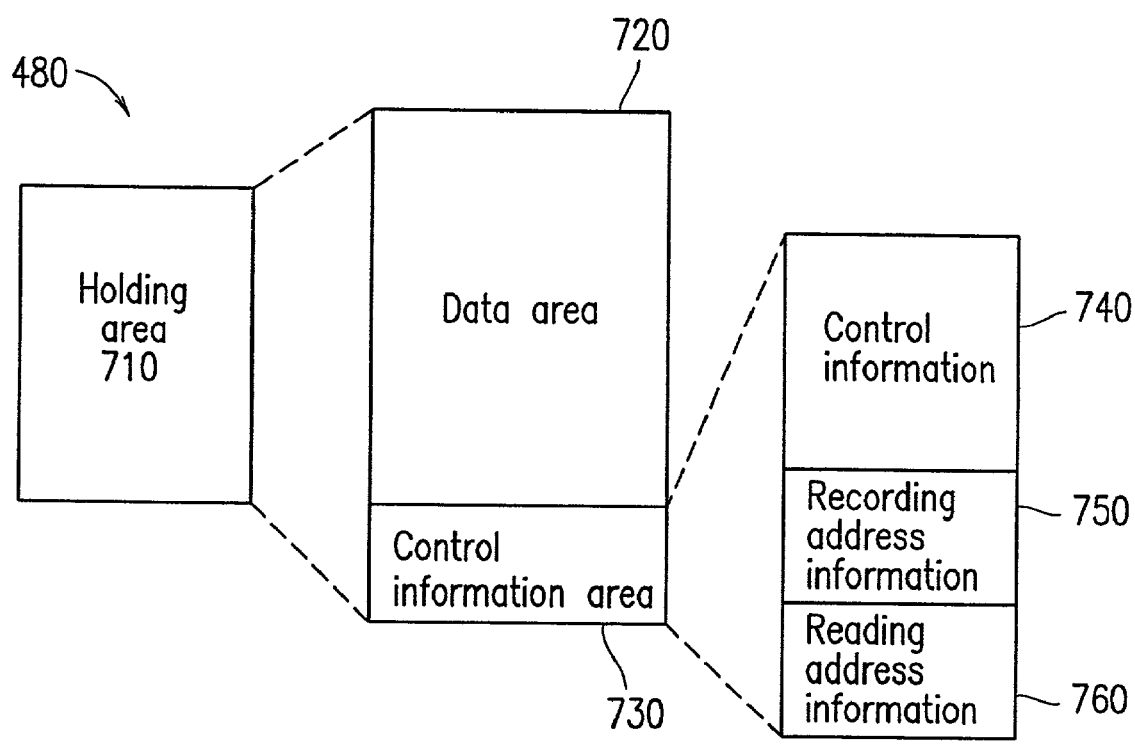
FIG. 7 shows a holding area of a holding section of a driving apparatus of the information recording and reproduction apparatus shown in FIG. 4.

FIG. 7 shows a holding area 710 of the holding section 480 of the driving apparatus 420 in detail. The holding area 710 includes a data area 720 and a control information area 730 for holding control information 740 for controlling the information recording medium 470. The control information area 730 includes an area for storing recording address information 750 representing a recording address and an area for storing reading address information 760 representing a reading address. Values of the areas are initialized when the information recording medium 470 is mounted on the driving apparatus 420.

Figure 8:
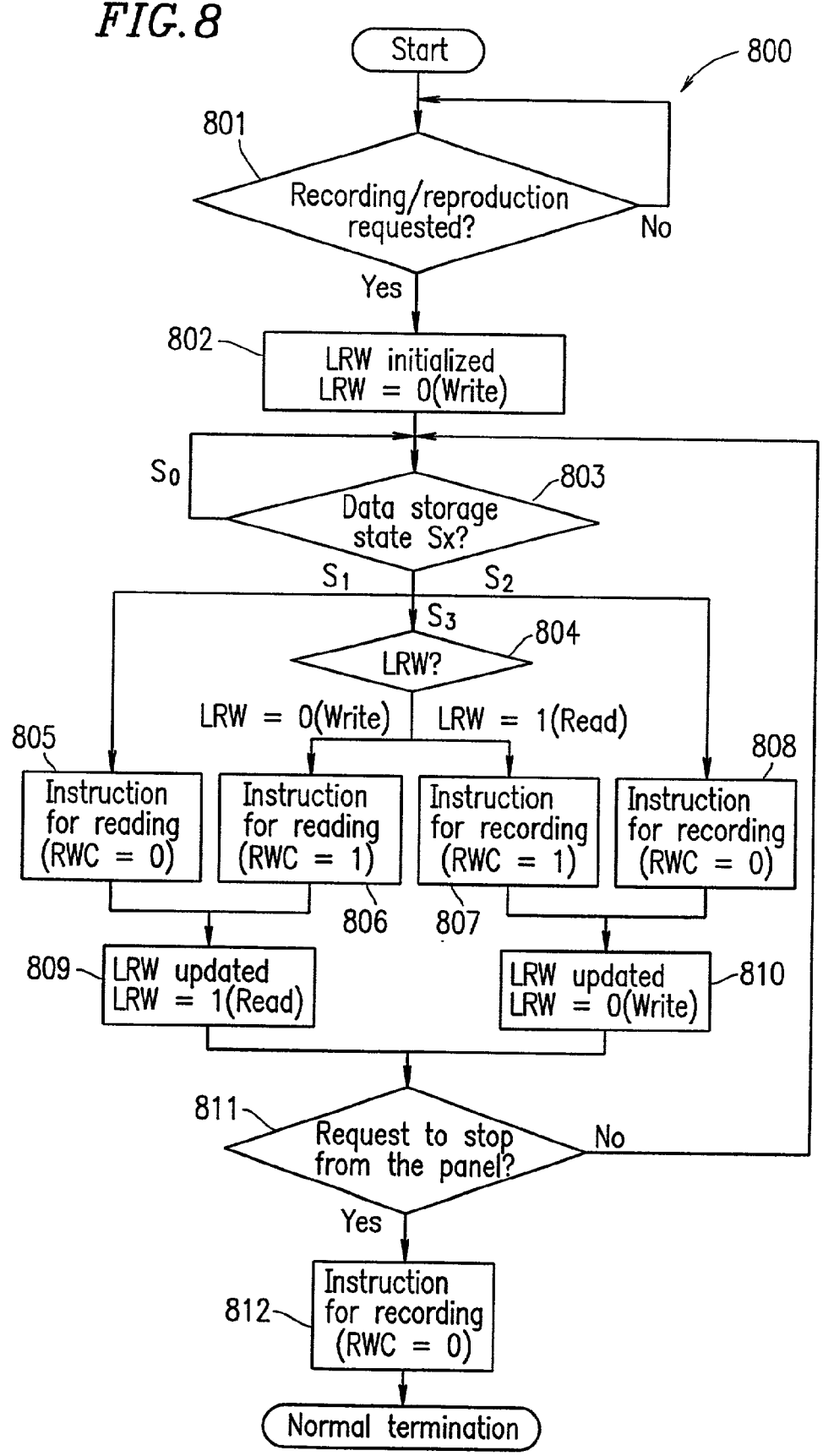
FIG. 8 is a flowchart illustrating an operation for determining a command to be output by the host system of the information recording and reproduction apparatus shown in FIG. 4 according to a first example of the present invention.

With reference to FIGS. 6 and 8, a method for generating a CDB 500 output by the host system 410 to the driving apparatus 420 for concurrently performing recording and reproduction will be described.

The encoded data area 620 and the decoded data area 630 can be in any of four states S0 through S3 which will be described below.

The encoded data area 620 has a capacitance Wm. An amount W of data which is stored in the encoded data area 620 exceeds a threshold level Wx, the data possibly overflows the encoded data area 620 unless data is recorded on the information recording medium 470 (i.e., unless data is output to the driving apparatus 420).

The decoded data area 630 has a capacitance Rm. An amount R of data which is stored in the decoded data area 630 is less than a threshold level Rx, the decoded data area 630 possibly becomes empty unless data is read from the information recording medium 470.

In state S0, neither the encoded data area 620 nor the decoded data area 630 requires recording or reading. In state S1, the decoded data area 630 requires reading. In state S2, the encoded data area 620 requires recording. In state S3, both the encoded data area 620 requires recording and the decoded data area 630 requires reading.

An LRW (Last Read/Write) bit in the management area 640 stores information indicating whether the last command which was output to the driving apparatus 420 is a reading command or a recording command.

In this example, an LRW bit of "1" indicates that the last command output to the driving apparatus 420 is a reading command, and an LRW bit of "0" indicates that the last command output to the driving apparatus 420 is a recording command.

FIG. 8 is a flowchart 800 illustrating a method for determining the type of command to be output by the host system 410, i.e., an operation of the host system 410 for generating a command CDB 500 in accordance with the amount of data stored in the encoded data area 620 and the decoded data area 630 of the memory section 450.

When a request for recording or reproduction is input by the user to the panel 458 (FIG. 4) in step 801, the LRW bit is initialized in step 802. In step 803, the state of the encoded data area 620 and the decoded data area 630 is checked.

When the encoded data area 620 and the decoded data area 630 are in state S0, the host system 410 waits until the encoded data area 620 and the decoded data area 630 go into another state.

When the encoded data area 620 and the decoded data area 630 are in state S1, in step 805, the RWC bit is set to be "0" and a reading command is output including advanced notice information indicating that the command which will be output next is also a reading command.

When the encoded data area 620 and the decoded data area 630 are in state S2, in step 808, the RWC bit is set to be "0" and a recording command is output including advanced notice information indicating that the command which will be output next is also a recording command.

When the encoded data area 620 and the decoded data area 630 are in state S3, the LRW bit is checked in step 804, and a command which is different from the immediately previous command is output. Specifically, when the immediately previous command is a recording command, a reading command is output in step 806. When the immediately previous command is a reading command, a recording command is output in step 807. In either case, the RWC bit is set to be "1" so as to notify the driving apparatus 420 in advance that a command which is of a different type will be output next.

Due to such a system, when the encoded data area 620 requires recording and the decoded data area 630 requires reading, it is guaranteed that the same type of commands are not output consecutively. Therefore, the command, whether recording or reading, can be output while including advanced notice information indicating whether or not the immediately subsequent command is of the same type as that of the command output currently. In the case where a reading command is output, the LRW is updated to "1" in step 809; and in the case where a recording command is output, the LRW is updated to "0" in step 810. Thereafter, the type of command output by the host system 410 is determined based on the state of the encoded data area 620 and the decoded data area 630.

When a request for stopping the operation is input by the user to the panel 458 (FIG. 4) in step 811, the data in the encoded data area 620 is recorded on the information recording medium 470 in step 812. Then, the operation is terminated.

The operation shown in FIG. 8 may be used for performing only recording or only reading as well as for performing recording and reading concurrently. In the case where the information recording and reproduction apparatus 400 performs only recording, the state of the encoded data area 620 and the decoded data area 630 is S2. Therefore, a recording command is output while notifying the driving apparatus 420 in advance that the next command is also a recording command. In the case where the information recording and reproduction apparatus 400 performs only reading, the state of the encoded data area 620 and the decoded data area 630 is S1. Therefore, a reading command is output while notifying the driving apparatus 420 in advance that the next command is also a reading command.

Figure 9:
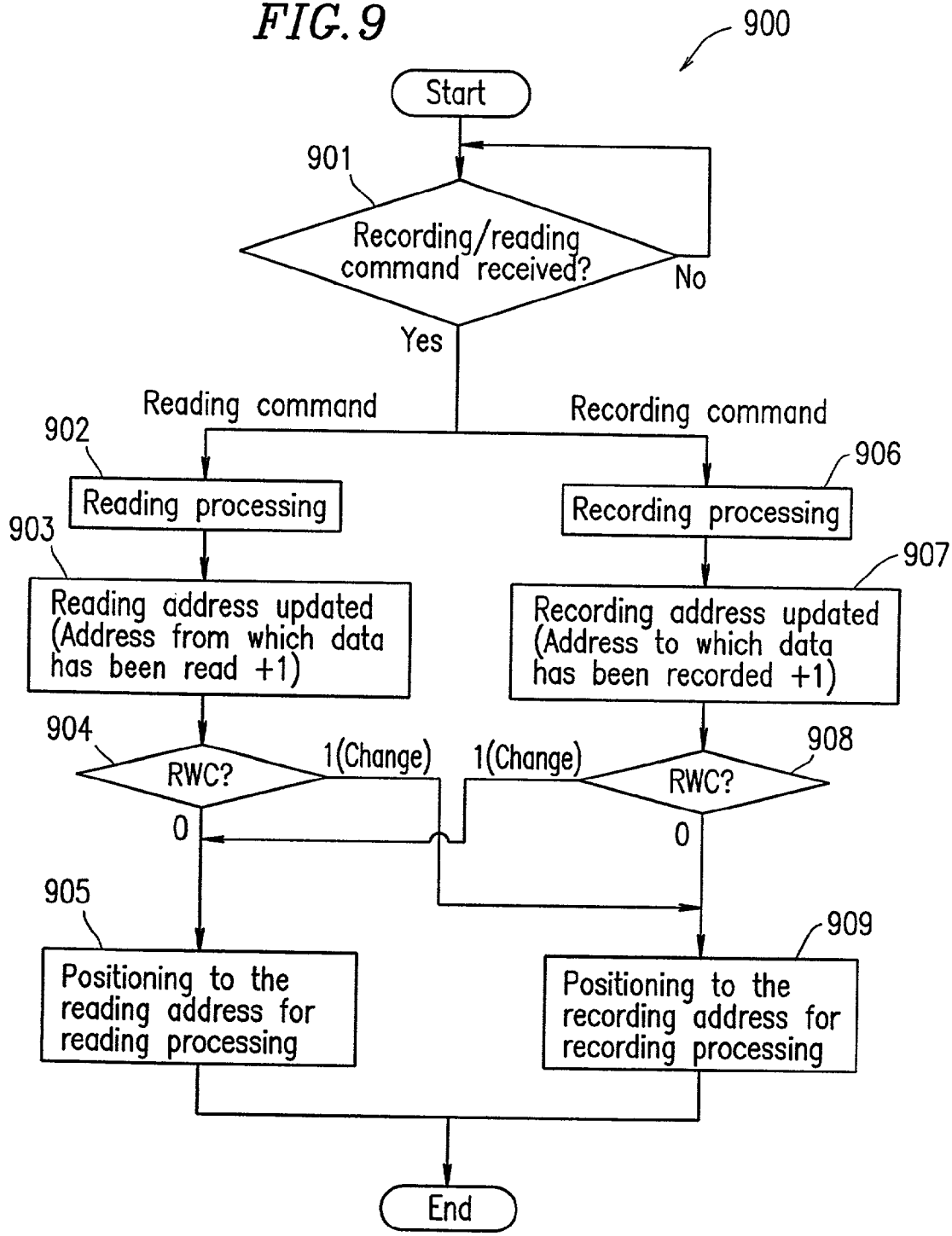
FIG. 9 is a flowchart illustrating an operation for recording and reading information to be performed by the driving apparatus of the information recording and reproduction apparatus shown in FIG. 4 according to a first example of the present invention.

FIG. 9 shows a flowchart 900 illustrating a recording and reading operation performed by the driving apparatus 420. With reference to FIGS. 4 and 9, an operation of the driving apparatus 420 when the driving apparatus 420 receives a reading or recording command will be described.

When the driving apparatus 420 receives a reading command in step 901, the recording and reading section 478 reads data from the information recording medium 470 to the holding section 480.

In step 902, the input/output section 472 transfers the data read by the recording and reading section 478 to the host system 410. Then, in step 903, an address, immediately after the address from which the data has been read, is stored in the holding section 480 as a reading address for the next reading processing (updating of the reading address). In step 904, the RWC bit of the command received in step 901 is checked. When the RWC bit is "1", the next command output from the host system 410 is a recording command. Therefore, in step 909, the driving apparatus 420 notifies the host system 410 that the reading operation is completed and substantially simultaneously, starts positioning to a recording address for preparation of the recording processing. When the RWC bit is "0", the next command output from the host system 410 is also a reading command. Therefore, in step 905, the driving apparatus 420 notifies the host system 410 that the reading operation is completed and substantially simultaneously, starts positioning to a reading address for preparation of the reading processing.

In the case where the driving apparatus 420 receives a recording command in step 901, the driving 420 apparatus operates similarly. The input/output section 472 receives data to be recorded from the host system 410 and transfers the data to the holding section 480. In step 906, the recording and reading section 478 records the data on the information recording medium 470. Then, in step 907, an address, immediately after the address to which the data has been recorded, is stored in the holding section 480 as a recording address for the next recording processing (updating of the recording address). In step 908, the RWC bit of the command received in step 901 is checked. When the RWC bit is "1", the next command output from the host system 410 is a reading command. Therefore, in step 905, the driving apparatus 420 notifies the host system 410 that the recording operation is completed and substantially simultaneously, starts positioning to a reading address for preparation of the reading processing. When the RWC bit is "0", the next command output from the host system 410 is also a recording command. Therefore, in step 909, the driving apparatus 420 notifies the host system 410 that the recording operation is completed and substantially simultaneously, starts positioning to a recording address for preparation of the recording processing.

In this example, the operation of performing recording and reading concurrently is mainly described. An operation of performing only recording or only reproduction is executed similarly except that the RWC bit is always "0". The command is not adversely affected by including the RWC bit.

As described above, in the first example, positioning for recording information or reading information is performed before the command including an instruction designating the type of operation is received. Therefore, the time period required before the recording and reading section 478 starts operation after receiving the instruction can be shortened.

EXAMPLE 2

In the first example, positioning is performed after a recording operation or a reading operation. As described with respect to the principle of the present invention, the present invention includes performing positioning for the immediately subsequent operation while a current recording operation or reading operation is performed. In a second example, a case where the information recording and reproduction apparatus 400 performs positioning while a current recording operation or reading operation is performed will be described with reference to FIG. 4.

An information recording medium such as a DVD-RAM is required to record or read information at a constant linear velocity. The time period required for positioning (positioning time) is a sum of the position shifting time required for shifting the recording and reading section 478 to the intended position and the rotation adjustment time required for adjusting the rotation speed of the information recording medium 470 to be appropriate at the position.

Figure 10:
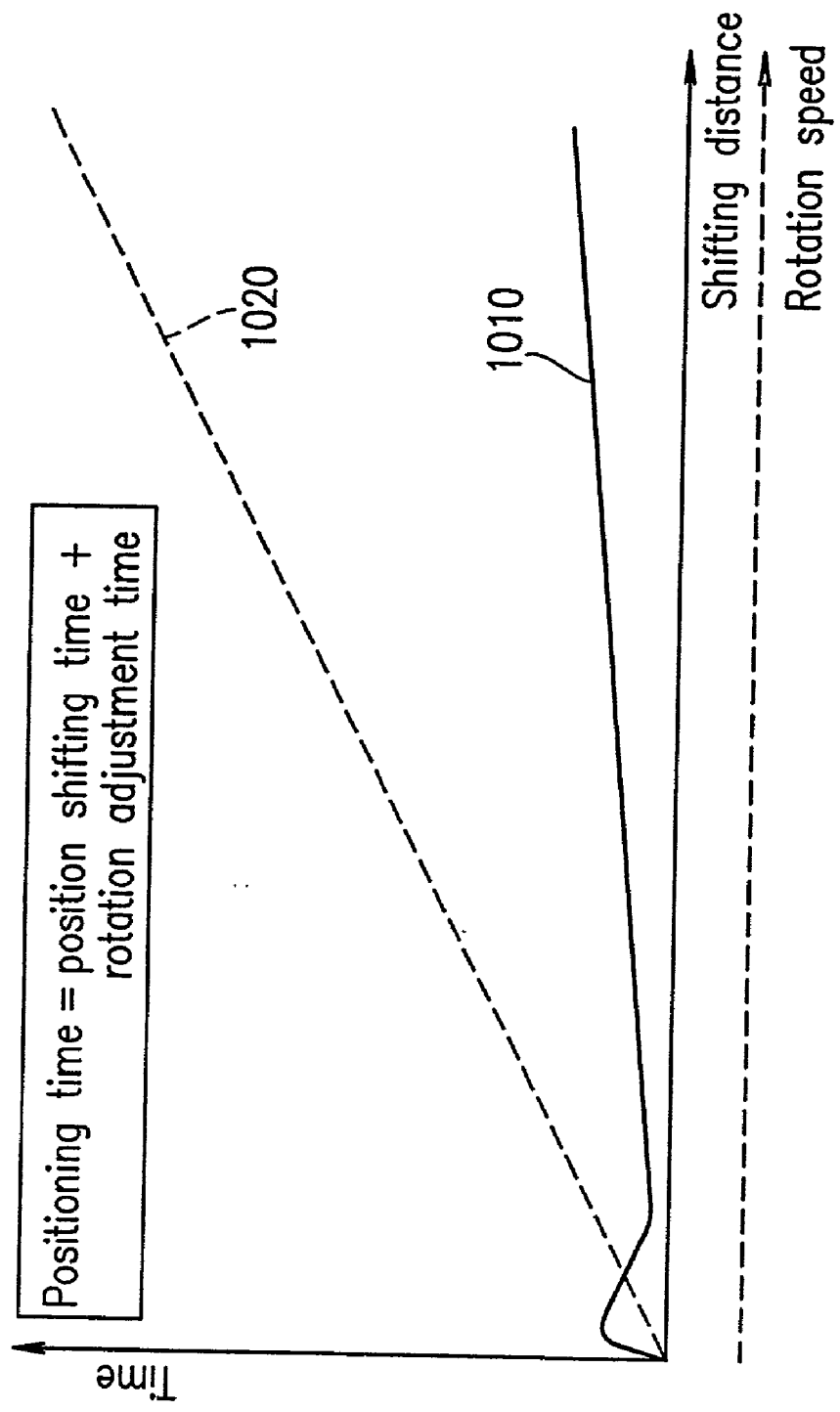
FIG. 10 is a graph illustrating the relationship among the shifting distance, the position shifting time and the rotation adjustment time of a recording and reading section of the information recording and reproduction apparatus shown in FIG. 4.

FIG. 10 illustrates the relationship among the shifting distance of the recording and reading section 478, the position shifting time required for shifting the recording and reading section 478 to the intended position, and the rotation adjustment time required for adjusting the rotation speed of the information recording medium 470 to be appropriate at the position. More specifically, solid line 1010 represents the relationship between the shifting distance of the recording and reading section 478 and the position shifting time. Dashed line 1020 represents the relationship between the shifting distance of the recording and reading section 478 and the rotation adjustment time. It is appreciated from FIG. 10 that as the shifting distance becomes larger, the rotation adjustment time increases at a steeper gradient than the position shifting time. Therefore, it is expected that the rotation adjustment time occupies a larger portion of the positioning time than the position shifting time. As shown in FIG. 10, a change in the rotation speed increases as the shifting distances increases.

An information recording medium such as a DVD-RAM has a mechanism for correcting a reading error. Therefore, even when the rotation speed is slightly different from the intended rotation speed, the recording and reading section 478 can appropriately read the information (jitter-free reproduction). For reproducing audio-visual information, reproducing the information in real time is generally more important than reproducing the information more accurately. Therefore, when audio-visual information is recorded and reproduced by the information recording and reproduction apparatus 400, it is desirable to reproduce information recorded on the information recording medium 470 (e.g., DVD-RAM) at an acceptable level of accuracy by using jitter-free reproduction while recording information on the information recording medium 470 at a high level of accuracy by adjusting the rotation speed of the information recording medium 470.

Figure 11:
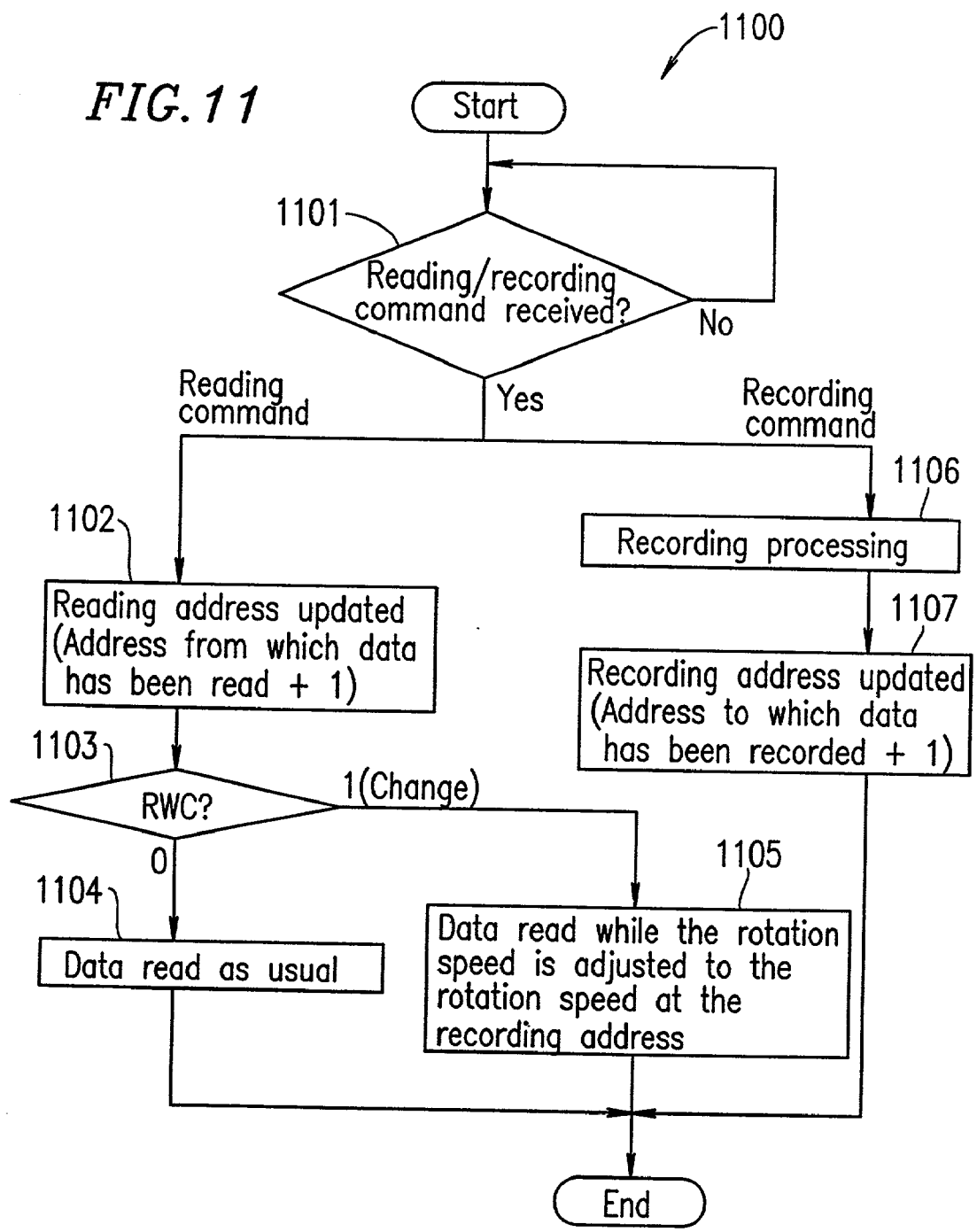
FIG. 11 is a flowchart illustrating an operation of the driving apparatus according to a second example of the present invention.

FIG. 11 shows a flowchart 1100 illustrating an operation in the second example of the driving apparatus 420 of the information recording and reproduction apparatus 400 shown in FIG. 4.

When, in step 1101, the driving apparatus 420 receives a reading command from the host system 410, in step 1102, an address, immediately after the address from which the data has been read, is stored in the holding section 480 as a reading address for the next reading processing (updating of the reading address). In step 1103, the RWC bit of the reading command received in step 1101 is checked. When the RWC bit is "1", the next command output from the host system 410 is a recording command. Therefore, in step 1105, the driving apparatus 420 reads data while adjusting the rotation speed of the information recording medium 470 to the rotation speed of the recording address. When the RWC bit is "0", the next command output from the host system 410 is also a reading command. Therefore, in step 1104, the driving apparatus 420 reads data as usual while maintaining the rotation speed.

When, in step 1101, the driving apparatus 420 receives a recording command from the host system 410, the input/output section 472 transfers the data received from the host system 410 to the holding section 480. After the recording and reading section 478 records the data on the information recording medium 470 in step 1106, an address, immediately after the address to which data has been recorded, is stored in the holding section 480 as a recording address for the next recording processing in step 1107 (updating of the recording address).

Since positioning for the next processing is performed while performing current processing, the time period required from the receipt of a command including an instruction designating the next processing until positioning is performed can be shortened or eliminated. Especially, it is preferable to perform rotation adjustment as positioning for the next processing while performing the reading processing. The reason for this is a reading operation can be appropriately performed even when the rotation speed of the information recording medium 470 is slightly different from the intended rotation speed.

EXAMPLE 3

In a third example, rotation adjustment is not performed when the rotation speed is lowered to a level at which the reading speed is unsatisfactorily low. Since rotation adjustment is not performed when the rotation speed is determined to be too low to provide a sufficiently high reading speed, the processing speed is prevented from being lowered. The third example is substantially the same as the second example except for this point.

Figure 12:
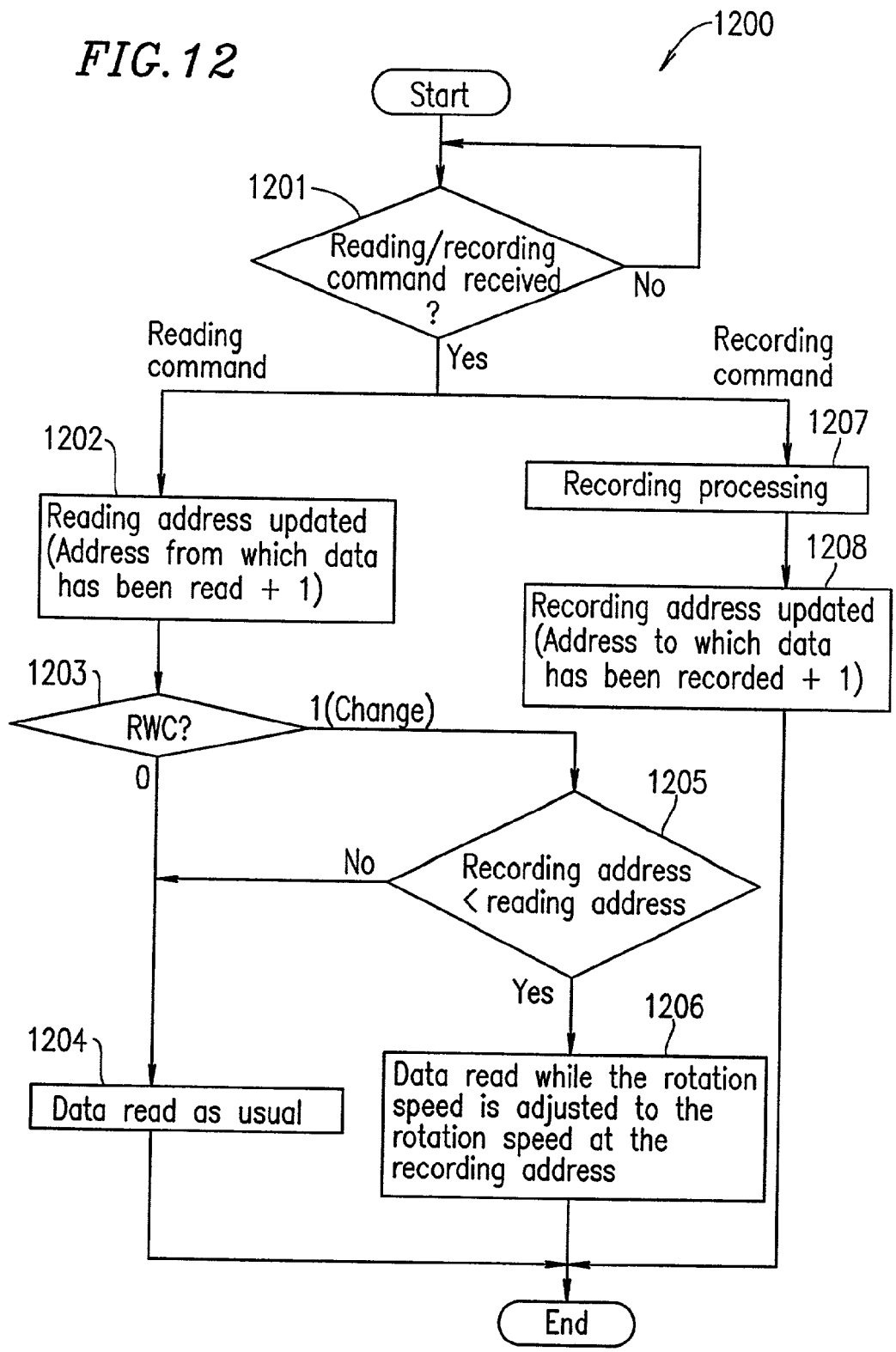
FIG. 12 is a flowchart illustrating an operation of the driving apparatus according to a third example of the present invention.

FIG. 12 shows a flowchart 1200 illustrating an operation in the third example of the driving apparatus 420 of the information recording and reproduction apparatus 400 shown in FIG. 4.

When, in step 1201, the driving apparatus 420 receives a reading command from the host system 410, in step 1202, an address, immediately after the address from which the data has been read, is stored in the holding section 480 as a reading address for the next reading processing (updating of the reading address). In step 1203, the RWC bit of the reading command received in step 1201 is checked. When the RWC bit is "1", the next command output from the host system 410 is a recording command. Therefore, in step 1205, the rotation speed of the information recording medium 470 at the reading address and the rotation speed of the information recording medium 470 at the recording address are determined. In general, when the address number of the reading address is larger than the address number of the recording address, the rotation speed of the information recording medium 470 at the reading address is higher than the rotation speed of the information recording medium 470 at the reading address. Therefore, in step 1206, the driving apparatus 420 reads data while adjusting the rotation speed of the information recording medium 470 to the rotation speed at the recording address. In general, when the address number of the reading address is smaller than the address number of the recording address, the rotation speed of the information recording medium 470 at the recording address is lower than the rotation speed of the information recording medium 470 at the reading address. Therefore, the driving apparatus 420 reads data as usual while maintaining the rotation speed in step 1204. When the RWC bit is "0", the next command output from the host system 410 is also a reading command. Therefore, in step 1204, the driving apparatus 420 reads data as usual while maintaining the rotation speed.

When, in step 1201, the driving apparatus 420 receives a recording command, the input/output section 472 transfers the data received from the host system 410 to the holding section 480. After the recording and reading section 478 records the data on the information recording medium 470 in step 1207, an address, immediately after the address to which data has been recorded, is stored in the holding section 480 as a recording address for the next recording processing in step 1208 (updating of the recording address).

EXAMPLE 4

Figure 13:
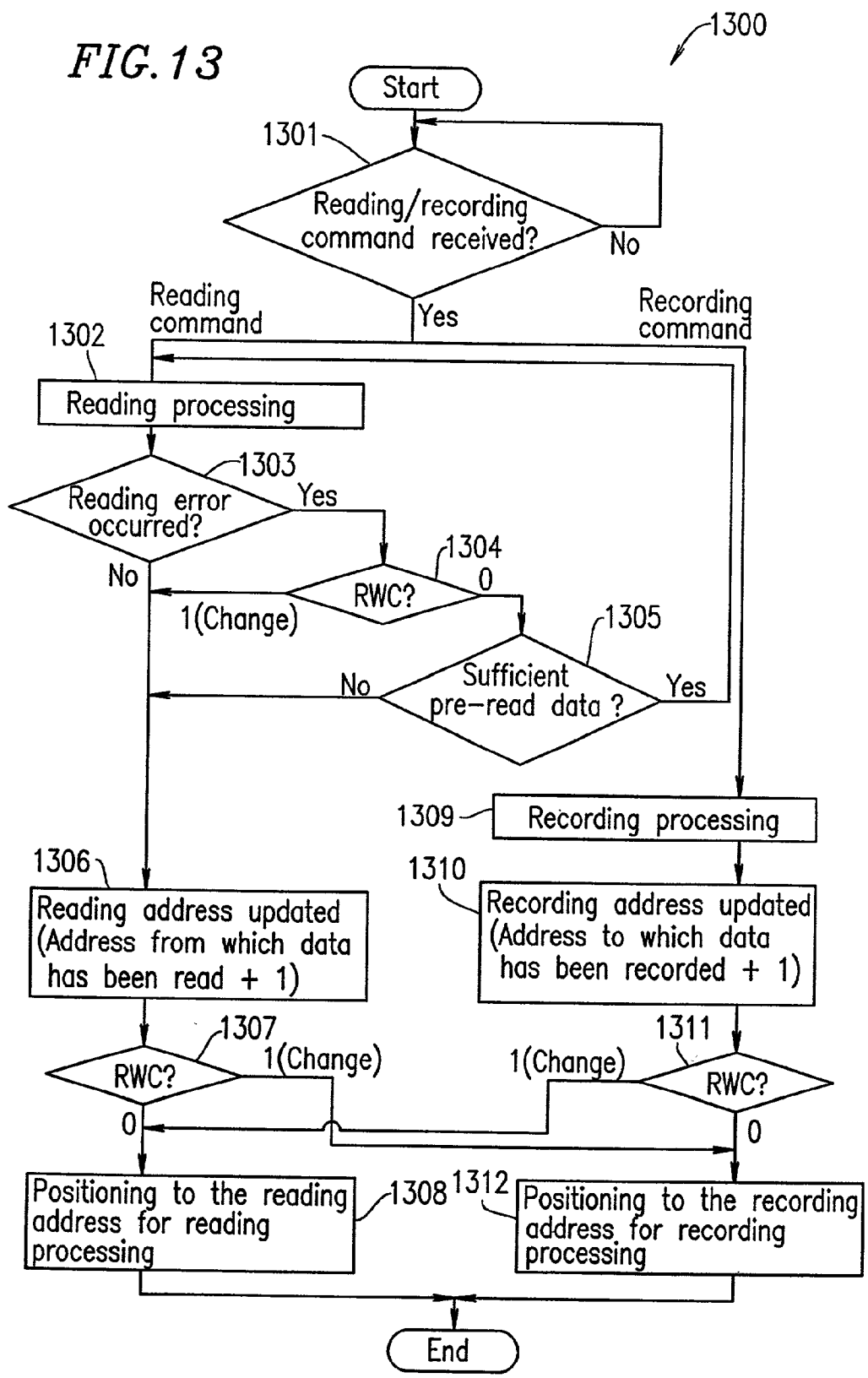
FIG. 13 is a flowchart illustrating an operation of the driving apparatus according to a fourth example of the present invention.

FIG. 13 shows a flowchart 1300 illustrating an operation in a fourth example of the driving apparatus 420 of the information recording and reproduction apparatus 400 shown in FIG. 4.

When, in step 1301, the driving apparatus 420 receives a reading command from the host system 410, in step 1302, the recording and reading section 478 reads the data from the information recording medium 470. The holding section 480 temporarily holds the data, and the input/output section 472 outputs the data to the host system 410.

When an error occurs when reading the data from the information recording medium 470 in step 1303, the RWC bit of the recording command received in step 1301 is checked in step 1304. When the RWC bit is "1", processing is performed as if the error did not occur (i.e., the operation in FIG. 9 in step 903 and thereafter is performed). When the RWC bit is "0", the amount of data which is pre-read in the holding section 480 is checked in step 1305.

When a sufficient amount of data is stored in the holding section 480, and thus there is still a sufficient time, the recording and reading section 478 reads data again in step 1302.

When data is read and a reading error does not occur in step 1303, an address, which is immediately after the address from which the data has been read, is stored in the holding section 480 as a reading address for the next reading processing in step 1306 (updating of the reading address). Then, the RWC bit of the reading command received in step 1301 is checked in step 1307. When the RWC bit is "1", the next command output from the host system 410 is a recording command. Therefore, the driving apparatus 420 notifies the host system 410 that the reading operation is completed and simultaneously starts positioning to the recording address for preparation of the recording processing in step 1312. When the RWC bit is "0", the next command output from the host system 410 is also a reading command. Therefore, the driving apparatus 420 starts positioning for preparation of the reading processing in step 1308.

When, in step 1301, the driving apparatus 420 receives a recording command from the host system 410, the input/output section 472 transfers the data received from the host system 410 to the holding section 480. The recording and reading section 478 records the data on the information recording medium 470 in step 1309. An address, immediately after the address to which the data has been recorded, is stored in the holding section 480 as a recording address for the next recording processing in step 1310 (updating of the recording address). When the RWC bit of the recording command received in step 1301 is "1" in step 1311, the next command output by the host system 410 is a reading command. Therefore, the driving apparatus 420 notifies the host system 410 that the recording operation is completed and simultaneously starts positioning to the reading address for preparation of the reading processing in step 1308. When the RWC bit is "0" in step 1311, the next command output by the host system 410 is also a recording command. Therefore, the driving apparatus 420 starts positioning to the recording address for preparation of the recording processing in step 1312.

As described above, when an error occurs, it is determined whether or not the reading operation is to be performed again based on the amount of data which has been pre-read in the holding section 480 and the instruction for the next operation. Therefore, a reading operation can be performed without influencing reproduction.

A host system according to the present invention is used in combination with a driving apparatus for recording information on an information recording medium and reading information recorded on the information recording medium. An instruction generation section of the host system generates an instruction including designation information which designates whether an operation type of an operation to be performed by the driving apparatus is a recording operation of recording information on an information recording medium or a reading operation of reading information recorded on an information recording medium, and advanced notice information indicating whether the operation type of an operation (next operation) immediately subsequent to the operation designated by the designation information is the same as the operation type of the operation designated by the designation information. An output section of the host system outputs the instruction to the driving apparatus.

As described above, the instruction which is output from the output section of the host system includes the designation information which designates whether an operation type of an operation to be performed by the driving apparatus is a recording operation of recording information on an information recording medium or a reading operation of reading information recorded on an information recording medium, and the advanced notice information indicating whether the operation type of the next operation is the same as the operation type of the operation designated by the designation information. Therefore, the driving apparatus used in combination with the host system according to the present invention recognizes, when receiving the designation information, whether the operation type of the next operation is the recording operation or the reading operation. For this reason, the driving apparatus can start preparing for the next operation without designation information on the next operation.

As compared to an apparatus which starts prepared for the next operation after receiving the designation information on the next operation, the driving used in combination with the host system according to the present invention can eliminate or at least shorten the time period required for preparing for the next operation. The driving apparatus can quickly start performing the next operation upon receiving the designation information on the next operation. The host system according to the present invention, which generates and outputs the above-described instruction, can shorten the time period required from the output of the designation information until the completion of the operation of the driving apparatus based on the designation information.

The host system further includes an information input section for receiving information recorded on the information recording medium. The instruction generation section further includes a memory section for temporarily storing the information received by the information input section before the information is output from the output section to the driving apparatus so as to be recorded on the information recording medium and for temporarily storing the information received by the input section from the driving apparatus before the information is reproduced by the reproduction section. The instruction generation section further includes a processing section for generating the designation information and the advanced notice information based on a state of the memory section.

The processing section compares an amount of information temporarily stored in the memory section before being output to the driving apparatus so as to be recorded on the information recording medium and an amount of information temporarily stored in the memory section before being reproduced by the reproduction section. Thus, the designation information and the advanced notice information are generated.

The processing section generates the designation information and the advanced notice information so that the amount of information temporarily stored in the memory section before being output to the driving apparatus does not exceed a prescribed amount and also so that the amount of information temporarily stored in the memory section before being reproduced by the reproduction section does not become zero. Since the processing section generates the designation information and the advanced notice information so that the amount of information temporarily stored in the memory section before being output to the driving apparatus does not exceed a prescribed amount, the information received by the information receiving section temporarily stored in the memory section before being output to the driving apparatus is prevented from being lost due to the amount exceeding the prescribed amount. Thus, recording failure is prevented. Since the processing section generates the designation information and the advanced notice information so that the amount of information temporarily stored in the memory section before being reproduced by the reproduction section does not become zero, the information to be reproduced by the reproduction section is prevented from being disconnected. Thus, continuous reproduction is realized.

A driving apparatus according to the present invention is used in combination with a host system. A recording and reading section of the driving apparatus records information on an information recording medium and reads information recorded on the an information recording medium. An instruction receiving section of the driving apparatus receives an instruction including designation information and advanced notice information from the host system. The recording and reading section of the driving apparatus determines whether the operation type of the next operation is a recording operation or a reading operation based on the designation information and the advanced notice information received by the instruction receiving section, and starts positioning for the next operation.

Before receiving the designation information on the next operation, the driving apparatus can start positioning for the operation type of the next operation.

As compared to an apparatus which starts prepared for the next operation after receiving the designation information on the next operation, the driving according to the present invention can eliminate or at least shorten the time period required for positioning for the next operation. The driving apparatus can quickly start performing the next operation upon receiving the designation information on the next operation. Therefore, the driving apparatus can shorten the time period required from the receipt of the designation information until the completion of the operation of the driving apparatus.

According to the present invention, the next operation can be notified to the driving apparatus in advance when a recording command or a reading command is output. For reproducing video data, there is a very high possibility that continuous addresses are accessed. Therefore, the driving apparatus can start positioning to the next access position concurrently with notifying the host system that the operation designated by the command is completed. Thus, the command processing time can be shortened.

According to the present invention, the host system for outputting a recording command or a reading command to the driving apparatus can estimate the time period required for recording information on the information recording medium or the time period required for reading information from the information recording medium, without considering the time required for the driving apparatus to access the information recording medium. Therefore, the timing for switching recording and reading is easily controlled. This is highly effective in practical use for performing recording and reproduction in parallel.

According to the present invention, the next operation can be notified to the driving apparatus in advance when a recording command or a reading command is output. This realizes a high performance rotation adjustment. The overhead time between commands is shortened and as a result, the command processing time is shortened.

According to the present invention, the next operation can be notified to the driving apparatus in advance when a recording command or a reading command is output. Therefore, recovery appropriate to each situation can be performed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A host system used in combination with a driving apparatus for recording information on an information recording medium and reading information recorded on the information recording medium, the host system comprising:
    an instruction generation section for generating an instruction including designation information designating an operation type of an operation to be performed by the driving apparatus, and advanced notice information indicating whether the operation type of an operation immediately subsequent to the operation designated by the designation information is the same as the operation type of the operation designated by the designation information; and
    an output section for outputting the instruction to the driving apparatus,
    wherein the operation type is either one of a recording operation of recording information on the information recording medium or a reading operation of reading information recorded on the information recording medium.

2. A host system according to claim 1, wherein when the operation type designated by the designation information is the recording operation, the output section outputs information to be recorded by the driving apparatus on the information recording medium together with the designation information.

3. A host system according to claim 1, further comprising an input section for receiving, from the driving apparatus, information read by the driving apparatus from the information recording medium.

4. A host system according to claim 3, further comprising a reproduction section for reproducing the information received by the input section from the driving apparatus.

5. A host system according to claim 4, further comprising an information input section for receiving information to be recorded on the information recording medium, wherein the instruction generation section includes:
- a memory section for temporarily storing the information received by the information input section before the information is output from the output section to the driving apparatus so as to be recorded on the information recording medium and for temporarily storing the information received by the input section from the driving apparatus before the information is reproduced by the reproduction section; and
- a processing section for generating the designation information and the advanced notice information based on a state of the memory section.

6. A driving apparatus used in combination with a host system, the driving apparatus comprising:
- a recording and reading section for recording information on an information recording medium and reading information recorded on the information recording medium; and
- an instruction receiving section for receiving, from the host system, an instruction including designation information designating an operation type of an operation to be performed by the recording and reading section, and advanced notice information indicating whether the operation type of an operation immediately subsequent to the operation designated by the designation information is the same as the operation type of the operation designated by the designation information, wherein:
the operation type is either one of a recording operation of recording information on the information recording medium or a reading operation of reading information recorded on the information recording medium, and
the recording and reading section determines whether the operation type of the operation immediately subsequent to the operation designated by the designation information is the recording operation or the reading operation based on the designation information and the advanced notice information received by the instruction receiving section, and starts positioning for the determined operation type.

7. A driving apparatus according to claim 6, further comprising a holding section for holding recording address information representing an address of the information recording medium to which the recording and reading section is to record information and reading address information representing an address of the information recording medium from which the recording and reading section is to read information,
wherein the recording and reading section starts positioning for the determined operation type based on the recording address information or the reading address information corresponding to the determined operation type.

8. A driving apparatus according to claim 7, wherein the positioning for the determined operation type includes at least one of position shifting of the recording and reading section to the address represented by the recording address information or the reading address information corresponding to the determined operation type, and rotation adjustment for adjusting a rotation speed of the information recording medium to a rotation speed corresponding to the address represented by the recording address information or the reading address information corresponding to the determined operation type.

9. A driving apparatus according to claim 6, wherein the recording and reading section starts the positioning for the determined operation type after the operation designated by the designation information is finished.

10. A driving apparatus according to claim 7, wherein when the operation type designated by the designation information is the reading operation and the determined operation type is the recording operation, the recording and reading section starts the positioning for the determined operation type while performing the operation designated by the designation information.

11. A driving apparatus according to claim 10, wherein the recording and reading section performs the rotation adjustment while performing the operation designated by the designation information.

12. A driving apparatus according to claim 11, wherein:
the reading address information or the recording address information held by the holding section is updated based on the designation information, and
the recording and reading section determines a rotation speed of the information recording medium corresponding to the determined operation type based on the determined operation type and the updated reading address information or recording address information, and adjusts the rotation speed of the information recording medium to the determined rotation speed.

13. A driving apparatus according to claim 10, wherein the recording and reading section determines whether the positioning for the determined operation type is to be started while performing the operation designated by the designation information based on the reading address information and the recording address information.

14. A driving apparatus according to claim 6, wherein when the determined operation type is the reading operation, the recording and reading section performs the operation immediately subsequent to the operation designated by the designation information after performing the positioning to the determined operation type.

15. A driving apparatus according to claim 7, wherein:
the holding section holds the information read by the recording and reading section from the information recording medium, and
when the operation type designated by the designation information and the determined operation type are both the reading operation, and an error occurs while the operation designated by the designation information is performed, the recording and reading section determines whether the operation designated by the designation information is to be performed again based on an amount of information read from the information recording medium and held by the holding section.

16. A driving apparatus according to claim 6, wherein when the operation type designated by the designation information is the reading operation and the determined operation type is the recording operation, and an error occurs while the operation designated by the designation information is performed, the recording and reading section performs the operation immediately subsequent to the operation designated by the designation information without performing the operation designated by the designation information again.

17. An information recording and reading method for a host system used in combination with a driving apparatus for recording information on an information recording medium and reading information recorded on the information recording medium, the method comprising the steps of:
generating an instruction including designation information designating an operation type of an operation to be performed by the driving apparatus, and advanced notice information indicating whether the operation type of an operation immediately subsequent to the operation designated by the designation information is the same as the operation type of the operation designated by the designation information; and outputting the instruction to the driving apparatus, wherein the operation type is either one of a recording operation of recording information on the information recording medium or a reading operation of reading information recorded on the information recording medium.

18. An information recording and reading method according to claim 17, wherein when the operation type designated by the designation information is the recording operation, the step of outputting includes the step of outputting information to be recorded by the driving apparatus on the information recording medium together with the designation information.

19. An information recording and reading method according to claim 17, further comprising the step of receiving information read by the driving apparatus from the information recording medium.

20. An information recording and reading method according to claim 19, further comprising the step of reproducing the information received from the driving apparatus.

21. An information recording and reading method according to claim 20, further comprising the step of receiving information to be recorded on the information recording medium, wherein the step of generating the instruction includes the step of generating the designation information and the advanced notice information based on a state of memory section, the memory section being for temporarily storing the information to be recorded on the information recording medium before the information is output to the driving apparatus so as to be recorded on the information recording medium and for temporarily storing the information read by the driving apparatus from the information recording medium before the information is reproduced.

22. An information recording and reading method for a driving apparatus used in combination with a host system, the driving apparatus including a recording and reading section for recording information on an information recording medium and reading information recorded on the information recording medium, the method comprising the steps of:

receiving, from the host system, an instruction including designation information designating an operation type of an operation to be performed by the recording and reading section, and advanced notice information indicating whether the operation type of an operation immediately subsequent to the operation designated by the designation information is the same as the operation type of the operation designated by the designation information, wherein the operation type is either one of a recording operation of recording information on the information recording medium or a reading operation of reading information recorded on the information recording medium;

determining whether the operation type of the operation immediately subsequent to the operation designated by the designation information is the recording operation or the reading operation based on the received designation information and the received advanced notice information; and starting positioning for the determined operation type.

23. An information recording and reading method according to claim 22, further comprising the step of holding recording address information representing an address of the information recording medium to which the recording and reading section is to record information and reading address information representing an address of the information recording medium from which the recording and reading section is to read information, wherein the step of starting positioning includes the step of starting the positioning for the determined operation type based on the recording address information or the reading address information corresponding to the determined operation type.

24. An information recording and reading method according to claim 23, wherein the step of starting positioning includes at least one of the steps of:

performing position shifting of the recording and reading section to the address represented by the recording address information or the reading address information corresponding to the determined operation type, and performing rotation adjustment for adjusting a rotation speed of the information recording medium to a rotation speed corresponding to the address represented by the recording address information or the reading address information corresponding to the determined operation type.

25. An information recording and reading method according to claim 22, wherein the step of starting positioning includes the step of starting the positioning for the determined operation type after the operation designated by the designation information is finished.

26. An information recording and reading method according to claim 23, wherein when the operation type designated by the designation information is the reading operation and the determined operation type is the recording operation, the step of starting the positioning includes the step of starting positioning for the determined operation type while performing the operation designated by the designation information.

27. An information recording and reading method according to claim 26, wherein the step of starting positioning includes the step of performing rotation adjustment of adjusting a rotation speed of the information recording medium to a rotation speed corresponding to the determined operation type while performing the operation designated by the designation information.

28. An information recording and reading method according to claim 27, further comprising the step of updating the reading address information or the recording address information based on the designation information, wherein the step of performing rotation adjustment includes the steps of:

determining a rotation speed of the information recording medium corresponding the determined operation type based on the determined operation type and the updated reading address information or recording address information, and adjusting the rotation speed of the information recording medium to the determined rotation speed.

29. An information recording and reading method according to claim 26, wherein the step of starting positioning includes the step of determining whether the positioning for the determined operation type is to be started while performing the operation designated by the designation information based on the reading address information and the recording address information.

30. An information recording and reading method according to claim 22, wherein when the determined operation type is the reading operation, the step of starting positioning includes the step of performing the operation immediately subsequent to the operation designated by the designation information after performing the positioning to the determined operation type.

31. An information recording and reading method according to claim 23, further comprising the steps of:
holding the information read by the recording and reading section from the information recording medium, and
when the operation type designated by the designation information and the determined operation type are both the reading operation, and an error occurs while the operation designated by the designation information is performed, determining whether the operation designated by the designation information is to be performed again based on an amount of information read from the information recording medium and held in the step of holding the information.

32. An information recording and reading method according to claim 22, wherein when the operation type designated by the designation information is the reading operation and the determined operation type is the recording operation, and an error occurs while the operation designated by the designation information is performed, performing the operation immediately subsequent to the operation designated by the designation information without performing the operation designated by the designation information again.

* * * * *